United States Patent
Nakanishi et al.

(10) Patent No.: US 8,060,684 B2
(45) Date of Patent: Nov. 15, 2011

(54) MEMORY CONTROL APPARATUS, MEMORY CONTROL METHOD AND PROGRAM

(75) Inventors: Kenichi Nakanishi, Tokyo (JP); Nobuhiro Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 11/220,040

(22) Filed: Sep. 6, 2005

(65) Prior Publication Data

US 2006/0059297 A1 Mar. 16, 2006

(30) Foreign Application Priority Data

Sep. 15, 2004 (JP) ................ P2004-268300

(51) Int. Cl.
*G06F 12/00* (2006.01)
*G06F 13/00* (2006.01)
*G06F 13/28* (2006.01)

(52) U.S. Cl. ............. 711/103; 711/154; 711/165

(58) Field of Classification Search ......... 711/103, 711/154, 165

See application file for complete search history.

(56) References Cited

U.S. PATENT DOCUMENTS

| | | | |
|---|---|---|---|
| 5,581,723 A * | 12/1996 | Hasbun et al. | 711/103 |
| 6,675,281 B1 * | 1/2004 | Oh et al. | 711/207 |
| 6,763,424 B2 * | 7/2004 | Conley | 711/103 |
| 6,795,890 B1 * | 9/2004 | Sugai et al. | 711/103 |
| 2004/0193781 A1 * | 9/2004 | Chung et al. | 711/103 |

* cited by examiner

*Primary Examiner* — Kevin Ellis
*Assistant Examiner* — Gary W. Cygiel
(74) *Attorney, Agent, or Firm* — K&L Gates LLP

(57) ABSTRACT

Memory control apparatus, memory control method, and program are provided. The present invention provides a preparatory process for determining whether or not a data-updating process to update data of a flash memory or a data-writing process to write new data into the memory has been completed normally. A data-updating process to update data stored in a specific block is carried out as a process including alternate-block processing to replace the specific block with another block referred to as an alternate block. In the current data-updating process, the alternate block is examined to determine whether or not data has been erased from the alternate block. If data has been erased from the alternate block, the preceding data-updating or data-writing process is determined to be normal. By virtue of a property exhibited by the contents of the reserved-block address, the reserved-block address needs to be saved in the flash memory only once during a data-updating or data-writing process.

9 Claims, 14 Drawing Sheets

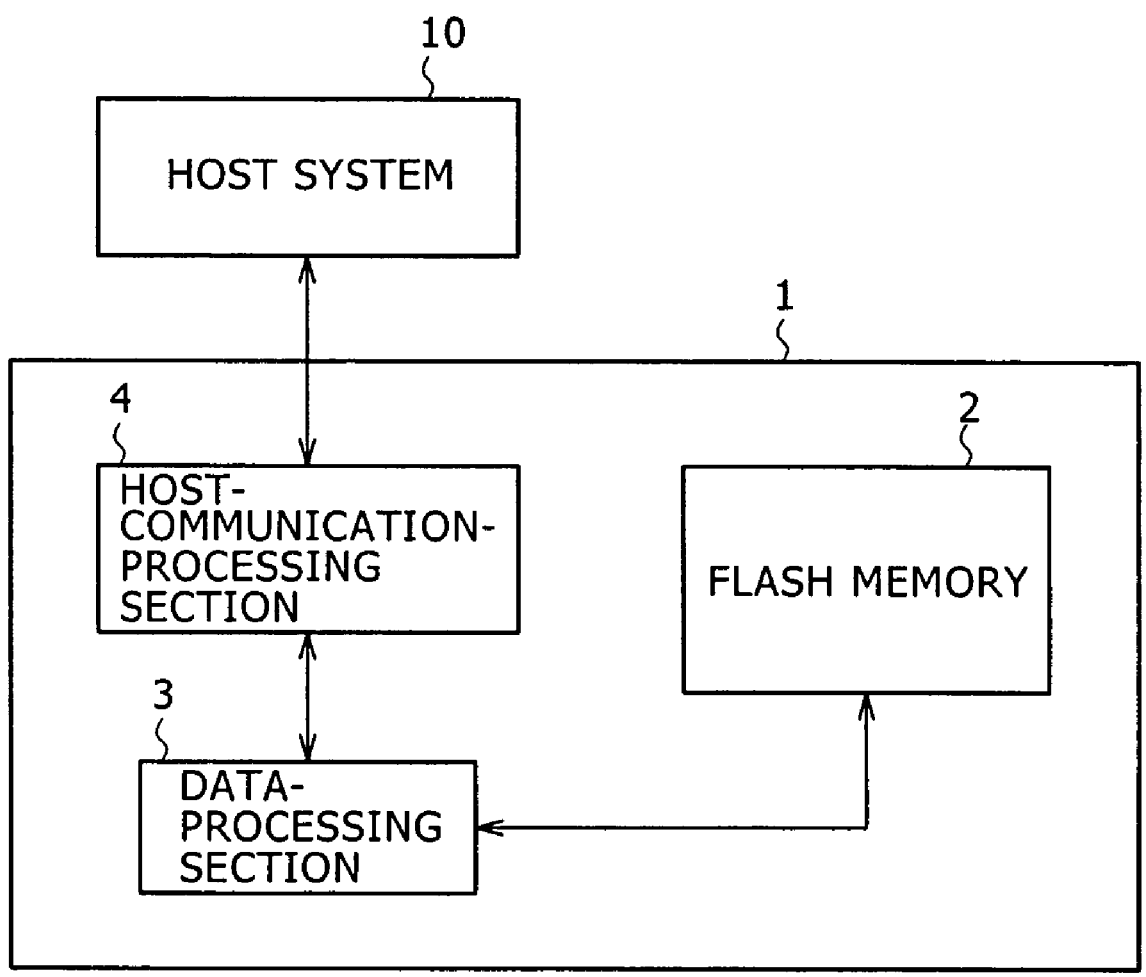

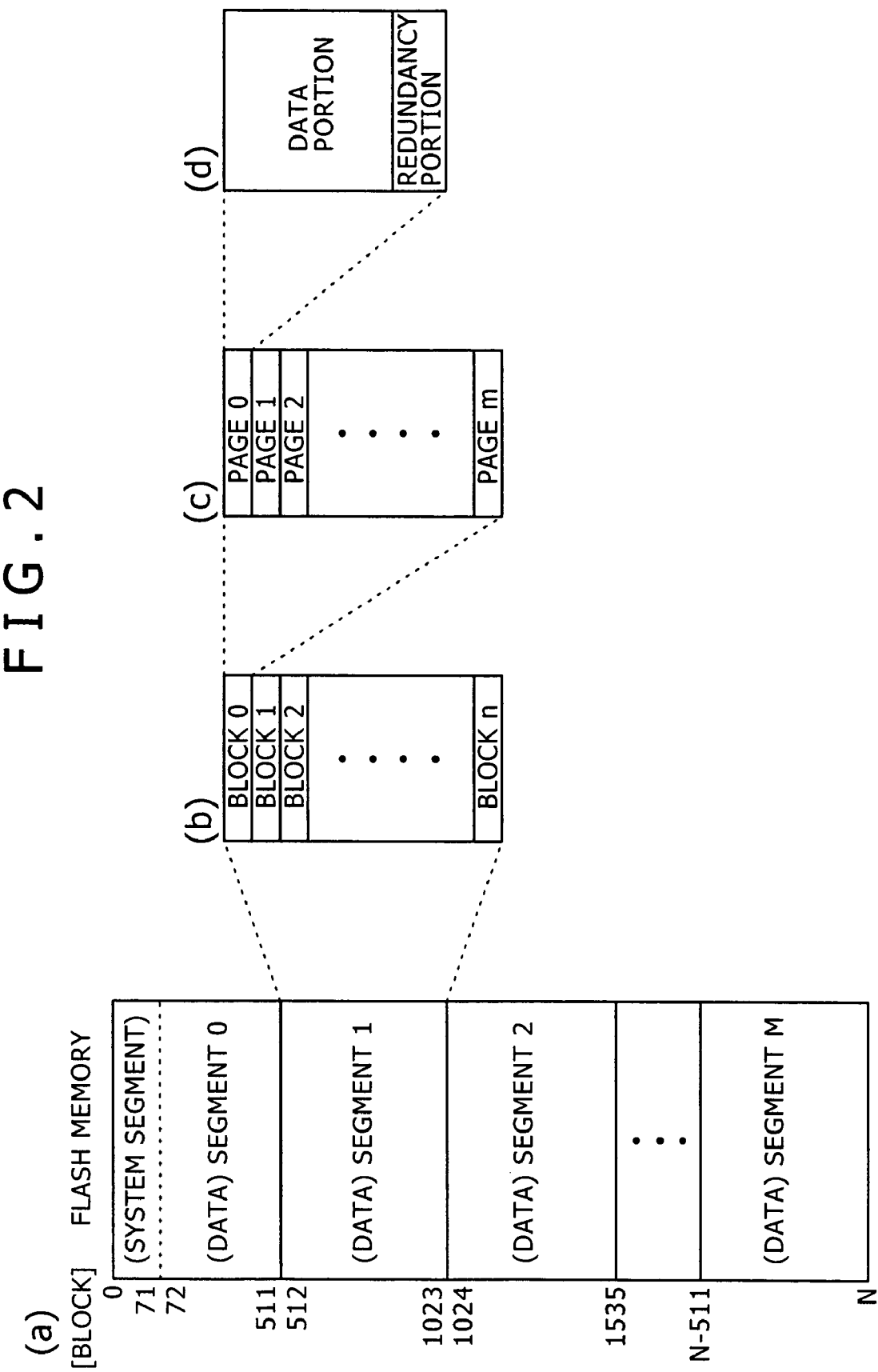

FIG.4

| LOGICAL ADDRESS | PHYSICAL ADDRESS |
|---|---|
| 1 | |
| 2 | |
| 3 | |
| ⋮ | ⋮ |
| X-1 | |
| X | |

FIG. 5

| | PHYSICAL-BLOCK RANGE | LOGICAL-ADDRESS RANGE |
|---|---|---|
| SEGMENT 0 | 0~511 | 0~489 |
| SEGMENT 1 | 512~1023 | 490~979 |
| SEGMENT 2 | 1024~1535 | 980~1469 |
| SEGMENT 3 | 1536~2047 | 1470~1959 |

MEMORY CONTROL APPARATUS, MEMORY CONTROL METHOD AND PROGRAM

CROSS REFERENCE TO RELATED APPLICATIONS

The present application claims priority to Japanese Patent Application No. 2004-268300 filed in the Japan Patent Office on Sep. 15, 2004, the entire contents of which being incorporated herein by reference.

BACKGROUND

The present invention relates to a memory control apparatus for executing control of operations such as writing of data into a non-volatile memory device such as a flash memory and reading out of data from such a memory device, relates to a memory control method adopted by the memory control apparatus as well as relates to a program to be executed by the memory control apparatus to implement the memory control method.

In recent years, as removable media, there is known a compact storage apparatus (or a semiconductor storage apparatus), which is provided with a non-volatile semiconductor memory device such as a flash memory and is capable of writing and reading out various kinds of data into and from the memory device.

The flash memory employed in such a semiconductor storage apparatus is known to have characteristics of not allowing already stored data to be overwritten and requiring that new data be written into an area from which data has already been erased. In addition, data is erased from the flash memory in block units each having a predetermined size to serve as a smallest unit of a physical storage area. On the other hand, data is written into a block in the flash memory in page units each having a predetermined size to serve as a smallest unit of the block of a storage area. Furthermore, the life of the flash memory is determined by the number of erase operations repeated so far. For this reason, data is written or existing data is updated as follows.

Let us assume for example that user data is written into the flash memory as an update. In this case, data is read out from a block in which the data to be updated has been stored, and the data read out from the block as well as additional data used as an update are used to generate updated data. Then, the updated data is written into another specific block from which data has been erased at this stage. Finally, data is erased from the block in which the data to be updated has been stored.

That is to say, when data is updated, the additional data used as an update is not written into the block in which the data to be updated has been stored. Instead, another specific block from which data has been erased is selected as a block into which the updated data is written in the so-called an alternate-block process. An effort is made to prevent erase and write operations from being carried out repeatedly and consecutively on a block during the same period of time so as to lengthen the life of the flash memory.

In addition, in order to execute data management with a high degree of efficiency for an operation to update data as described above, a file system introduces the concept of logical and physical addresses used in management of blocks. By adopting the concept of logical and physical addresses, data is written into and read out from the storage apparatus in block units. To put it concretely, the file system includes a logical-physical address conversion table, which is a table showing pairs each composed of a logical address and a physical address corresponding to the logical address. The logical-physical address conversion table is used as a table showing management information used for managing status indicating whether or not data has been written in each block in the flash memory. That is to say, by referring to this logical-physical address conversion table, for example, an access can be made to the flash memory through a FAT (File Allocation Table) in the same mechanism as the conventional one. The FAT is a table at a higher level in the file system.

After data is updated as described above, the logical-physical address conversion table is also updated to reflect results of the operations to update data of an actual block and erase the data from the block.

By the way, we naturally assume that, in the course of a data-writing process carried out to typically update data already stored in the flash memory, for example, the power supply may be interrupted or the semiconductor storage apparatus may be pulled out from the drive so that the data-writing process is discontinued.

In such a case, for example, when the semiconductor storage apparatus is activated again later, the storage status of physical data in the actual flash memory may not match the management information stored typically in the logical-physical address conversion table. With the storage status of physical data in the actual flash memory not matching the management information, in subsequent operations, normal data management and data accesses to the flash memory cannot be guaranteed.

SUMMARY

In order to solve the above problem, there is provided a predetermined step for producing a result of determination as to whether or not the previous data-writing process has been suspended as described above in the next activation of an actual data-writing process. In the next activation, the step is executed in a process called suspension determination to produce a result of determination as to whether or not the last data-writing process has been suspended. If the result of the suspension determination indicates that the last data-writing process has been actually suspended, write status of actual data in the flash memory is inspected and management information is reconstructed.

As described above, when a semiconductor storage apparatus is activated, first of all, a suspension determination process is carried out. Thus, when a data-writing process is carried out, a preparatory-processing step (or suspension-determination preparatory processing) for the suspension determination process is executed.

In this case, the suspension determination preparatory processing is always carried out for every data-writing process. Thus, it is necessary to carry out the suspension determination preparatory processing as efficiently as possible.

Addressing the problems described above, inventors of the present invention have devised a memory control apparatus including data-updating means for carrying out an alternate unit-area process as a process to update physical data in a memory, which has a storage area divided into erasure unit areas each used as a smallest unit of data erasure, by performing at least a process of writing an update into a write-object erasure unit area selected among the erasure unit areas in an already erased-data state, and a process to erase updated data from an update/erase-object unit area including the data to be updated.

In addition, the memory control apparatus further has: information generation means for generating area identification information used for identifying an erasure unit area in an already erased-data state as a unit area to be determined as a write-object erasure unit area in a next alternate unit-area process in execution of the alternate unit-area process; information-writing means for physically writing area identification information generated by the information generation means into the memory upon completion of an alternate unit-area process; and area determination means for determining an erasure unit area identified by area identification information written in the memory as a write-object erasure unit area to be used in a current alternate unit-area process executed by the data-updating means.

In an embodiment, the memory control apparatus further has suspension determination means for producing a result of determination as to whether or not suspension has occurred during a period between the start of a last alternate unit-area process and the end of a process carried out by the information-writing means by producing a result of determination as to whether or not data has been erased from an erasure unit area identified by area identification information currently stored in the memory.

In addition, the inventors of the present invention have devised a memory control method including the step of carrying out an alternate unit-area process as a process to update physical data in a memory, which has a storage area divided into erasure unit areas each used as a smallest unit of data erasure, by performing at least: a process of writing an update into a write-object erasure unit area selected among the erasure unit areas in an already erased-data state; and a process to erase updated data from an update/erase-object unit area including the data to be updated.

In an embodiment, the memory control method further has the steps of: generating area identification information used for identifying an erasure unit area in an already erased-data state as a unit area to be determined as a write-object erasure unit area in a next alternate unit-area process in execution of the alternate unit-area process; physically writing area identification information generated in the information generation step into the memory upon completion of an alternate unit-area process; and determining an erasure unit area identified by area identification information written in the memory as a write-object erasure unit area to be used in a current alternate unit-area process executed in the data-updating step.

In addition, the memory control method further has the step of producing a result of determination as to whether or not suspension has occurred during a period between the start of a last alternate unit-area process and the end of a process carried out in the information-writing step by producing a result of determination as to whether or not data has been erased from an erasure unit area identified by area identification information currently stored in the memory.

The inventors of the present invention have also devised a program for causing the memory control apparatus to execute the steps above, the program being stored on a computer readable medium.

In accordance with the configurations described above, the memory control apparatus and the memory control method control operations to update physical data in a memory, which has a storage area divided into erasure unit areas each used as a smallest unit of data erasure, to allow an operation of updating data to be carried out by performing an alternate unit-area process. In addition, in accordance with the present invention, in a suspension determination preparatory process, an area identification information is generated as information, which is used for identifying an erasure unit area (or a reserved block) in an already erased-data state as a unit area to be determined as a write-object erasure unit area in a next alternate unit-area process, and stored in the memory. The area identification information is stored into the memory in a sequence of operations upon completion of an alternate unit-area process carried out to update data.

In the case of the configurations described above, if the sequence of operations between the last alternate unit-area process and the process to store area identification information into the memory is completed normally, for example, the identification information is also stored into the memory normally. The area identification information stored in the memory is properly used for identifying an erasure unit area in an already erased-data state as a unit area to be determined as a write-object erasure unit area in a next alternate unit-area process carried out for writing an update into the write-object erasure unit area.

If the sequence of operations between the last alternate unit-area process and the process to store area identification information into the memory is suspended, on the other hand, the process to store area identification information into the memory is not completed normally so that, for example, the area identification information stored in the memory as information used for identifying a write-object erasure unit area in which an update has been written in the last alternate unit-area process remains unchanged as it is. Since the sequence of operations is suspended after the alternate unit-area process has been started, however, some data has been written into the write-object erasure unit area.

Thus, the suspension determination means (or the suspension determination step) is capable of carrying out a suspension determination process by determining whether or not data has been erased from an erasure unit area identified by the current area identification information.

As described above, the suspension determination process according to an embodiment of the present invention uses area identification information stored in the memory, and a process to store area identification information in the memory is carried out only once for every alternate unit-area process.

As described above, in accordance with the present invention, by carrying out the process to store area identification information into the memory in a suspension determination preparatory process at least once per an alternate unit-area process, the number of operations becomes small in comparison with a configuration in which the process to store area identification information into the memory is carried out several times per an alternate unit-area process.

Thus, the time it takes to update (or write) data having a certain size can be shortened since the number of accesses to the memory is reduced.

In addition, the purpose of carrying out an alternate unit-area process described above is to lengthen the life of the memory having a characteristic that the life is determined by the number of erasure operations, and the erasure frequency of the erasure unit area can be reduced by decreasing the number of operations to write data into the memory. That is to say, the object to lengthen the life of the memory can also be achieved.

As described above, in the present invention, the efficiency of the suspension determination preparatory process is improved as long as the data-processing speed of the memory and the life of the memory are concerned.

Additional features and advantages are described herein, and will be apparent from, the following Detailed Description and the figures.

BRIEF DESCRIPTION OF THE FIGURES

FIG. 1 is a block diagram showing a typical internal configuration of a semiconductor storage apparatus according to an embodiment of the present invention.

FIG. 2 is a diagram showing the physical structure of a flash memory employed in the semiconductor storage apparatus according to the embodiment.

FIG. 4 is a diagram conceptually showing the data structure of a logical-physical address conversion table.

FIG. 5 is a diagram showing relations between ranges of physical addresses and ranges of logical addresses for a flash memory divided into a plurality of segments.

DETAILED DESCRIPTION

Figure 3A:
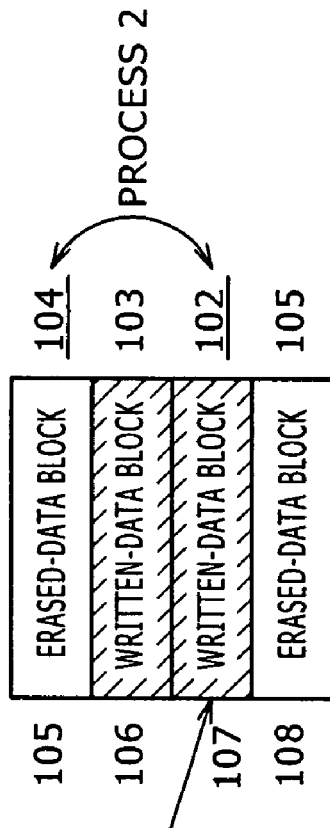
FIGS. 3A and 3B are diagrams referred to in explaining a process to update data stored in the flash memory according to the embodiment and the concept of logical and physical addresses for the flash memory.

A preferred embodiment referred to hereafter simply as an embodiment is explained below. The embodiment implements a typical semiconductor storage apparatus employing a flash memory as a semiconductor memory device.

The semiconductor storage apparatus has the configuration of single independent removable media with an external shape typically resembling a small-size plate.

It is to be noted that the embodiment is explained in chapters arranged in the following order:

1: Configuration of the Semiconductor Storage Apparatus
2: Physical Format of the Flash Memory
3: Concept of Physical and Logical Addresses
4: Logical-Physical Address Conversion Table
5: First Typical BMAP Structure
6: Second Typical BMAP Structure
7: SMAP
8: Data-Writing (Updating) Processing Step
   8-1: Writing User Data
   8-2: Writing Management Information (SMAP and BMAP)
9: Processing Operations
   9-1: Data-Writing Processing
   9-2: Suspension Determination Processing
   9-3: BMAP Reconstruction Processing
10: Other Suspension Determination Configuration
1: Configuration of the Semiconductor Storage Apparatus FIG. 1 is a diagram showing a typical internal configuration of a semiconductor storage apparatus 1 according to an embodiment.

As shown in the figure, the semiconductor storage apparatus 1 has a flash memory 2, a data-processing section 3 and a host-communication-processing section 4.

As is generally known, the flash memory 2 is one of semiconductor non-volatile memory devices. The flash memory 2 in this case has a predetermined storage capacity.

The data-processing section 3 is a component for controlling and carrying out operations to read out data from the flash memory 2 and write data thereto (as well as erase data therein) as data processing in the semiconductor storage apparatus 1. In order to control and carry out these operations, the data-processing section 3 utilizes management information, which is information necessary for reading out data from the flash memory 2 and writing data thereto (as well as erasing data stored therein). In addition, the data-processing section 3 also manages the management information by carrying out mainly operations to update the management information. On top of that, the data-processing section 3 also controls communications between the host-communication-processing section 4 and a host system 10.

The data-processing section 3 is typically a microcomputer with a configuration including components such as a CPU, a ROM and a RAM.

The host-communication-processing section 4 includes a hardware device for carrying out communications between the host system 10 and the data-processing section 3 by adoption of a predetermined communication method.

The host-communication-processing section 4 is a component for receiving information such as a command (or a response) and data from the host system 10, which transmits the information by adoption of a predetermined communication method. The host-communication-processing section 4 then decodes the information and converts the result of the decoding into data having a format conforming to an internal data communication method of the semiconductor storage apparatus 1. Subsequently, the host-communication-processing section 4 supplies the result of the conversion to the data-processing section 3. Receiving a command or data from the host-communication-processing section 4, the data-processing section 3 carries out a process in response to the command or an operation to write the data into the flash memory 2.

In addition, the data-processing section 3 also transmits a command (or a response) or data read out from the flash memory 2 to the host system 10 by way of the host-communication-processing section 4. In this case, the data-processing section 3 supplies the command (or the response) or the data to the host-communication-processing section 4, and issues a transmit command to the host-communication-processing section 4, requesting the host-communication-processing section 4 to transmit the command (or the response) or the data to the host system 10. In accordance with this transmit command, the host-communication-processing section 4 converts the command (or the response) or the data, which are received from the data-processing section 3, into one having a format conforming to the method of communication with the host system 10, and transmits the result of the conversion to the host system 10.

The host system 10 is an electronics device typically having predetermined functions. The host system 10 typically has a slot member, which the semiconductor storage apparatus 1 implemented as removable media can be mounted on and removed from. The host system 10 is capable of writing and reading out data into and from the semiconductor storage apparatus 1 mounted on the slot.

The following description explains what apparatus the host system 10 is. The host system 10 is typically a personal computer, a digital still camera, a digital video recorder or a portable phone. Nevertheless, the host system 10 is not specially limited to a personal computer, a digital still camera, a digital video recorder and a portable phone. Let us assume that the host system 10 is a digital still camera. In this case, a taken picture resulting from a shooting operation is transferred to the semiconductor storage apparatus 1 to be stored in the flash memory 2. On the other hand, a picture is read out from the flash memory 2 employed in the semiconductor storage apparatus 1 to be displayed on a display section of a liquid-crystal display section of the digital still camera.

2: Physical Format of the Flash Memory

Next, the physical format of the flash memory 2 is explained by referring to FIG. 2.

As shown in FIG. 2(*a*), first of all, the entire storage area of the flash memory 2 is divided into segments 0 to M each having a fixed length determined in advance.

Then, as shown in FIG. 2(*b*), a segment is divided into blocks 0 to n each having a fixed length also determined in advance. The blocks are also each referred to hereafter as an erasure unit area. As is generally known, a flash memory does not allow data already stored therein to be overwritten. That is to say, new data must be written into an erased-data area, and blocks are smallest units in which new data is written into such an area.

In accordance with the format provided by this embodiment, as a rule, a segment is divided into 512 blocks. In this case, the last block number n of every segment is a block having a block number of 511 as shown in FIG. 2(*b*). Each of the (M+1) segments, i.e., segments 0 to M shown in FIG. 2(*a*), is further divided into 512 blocks.

FIG. 2(*a*) also shows block addresses (or physical addresses) assigned to the storage area of the flash memory 2. To put it concretely, block addresses are assigned to each of the segments 0 to M as follows. Block addresses of 0 to 511 are assigned to the 512 blocks pertaining to segment 0 and block addresses of 512 to 1,023 are assigned to the 512 blocks pertaining to segment 1. Block addresses of 1,024 to 1,535 are assigned to first several blocks pertaining to segment 2. That is to say, the difference between addresses assigned to a specific segment and corresponding addresses assigned to a segment adjacent to the specific segment is an offset of 512 blocks.

In addition, the segment count M representing number of segments composing a flash memory 2 is prescribed to be at least 1. In actuality, the number of segments composing a flash memory 2 varies from memory to memory in dependence on the storage capacity of the memory.

As shown in FIG. 2(*a*), the beginning of segment 0 is used as a system segment, which will be described later.

Each of the blocks shown in FIG. 2(*b*) is further divided into pages 0 to m shown in FIG. 2(*c*).

Having a fixed length, each of the pages includes a data portion and a redundancy portion, which each have a predetermined size as shown in FIG. 2(*d*). The data portion is an area used for storing data whereas the redundancy portion is an area used for storing, among others, various kinds of management information.

Data is written into a block in page units each used as a smallest unit. That is to say, data is erased from the flash memory 2 in block units but written into the flash memory 2 in page units, which each have a size different from the block unit. It is to be noted that the page count m representing the number of pages in a block is not prescribed to be a fixed value. Instead, the number of pages in a block can be, for example, 16 (corresponding to m=15), 32 (corresponding to m=31) or 64 (corresponding to m=63).

3: Concept of Physical and Logical Addresses

Figure 3B:
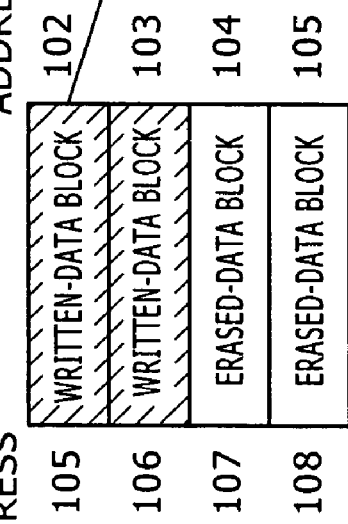

With the above physical format of the flash memory 2 kept in mind, a concept of physical and logical addresses defined in the file management of the flash memory 2 is explained by referring to FIGS. 3A and 3B. FIGS. 3A and 3B are diagrams showing a step for updating data.

FIG. 3A is a diagram showing a model of a state prior to a process to update data in some of four blocks included in a segment.

A physical address is assigned to a physical block in the flash memory 2. A physical block is a block physically existing in the flash memory 2. The physical address assigned to a physical block is determined by the physical position of the physical block in an array of blocks in the flash memory 2. Thus, the physical address assigned to every physical block is fixed since the physical position of the physical block in the array of blocks does not change. The block addresses shown in FIG. 2(*a*) are each a physical address assigned to a physical block.

Physical addresses of 105, 106, 107 and 108 are sequentially assigned to respectively the four blocks shown in FIG. 3A, with the address of 105 assigned to the uppermost block. It is to be noted that an actual physical address has a typical length of 2 bytes.

As shown in FIG. 3A, the blocks pointed to by the physical addresses of 105 and 106 are each a block in which data has been written. On the other hand, the blocks pointed to by the physical addresses of 107 and 108 are each a block from which data has been erased or a block in which no data has been written.

On the other hand, a logical address is an address assigned to data written (or to be written) in a block. A logical address is used by a FAT (File Allocation Table) file system positioned at a layer higher than a layer for managing logical and physical addresses.

Logical addresses of 102, 103, 104 and 105 are sequentially assigned to respectively the four blocks shown in FIG. 3A, with the address of 102 assigned to the uppermost block. It is to be noted that an actual logical address has a typical length of 2 bytes.

Then, let us assume for example that data stored in a block pointed to by the physical address of 105 in the state shown in FIG. 3A is updated by renewing the content, adding new data to the existing data or deleting some of the data.

In such a case, the file system of the flash memory 2 is updated to indicate that data obtained as a result of the updating the stored data is not written into the same block. Instead, the file system is updated to indicate that the data obtained as a result of the updating the stored data is written into a new block from which data has been erased.

In this regard, in process 1 shown in FIGS. 3A and 3B as a process resulting in a transition from the state of FIG. 3A to the state of FIG. 3B, an update for data already written in a block pointed to by the physical address of 105 is written into an unused block pointed to by the physical address of 107. Then, the data already written in the block pointed to by the physical address of 105 is erased.

Subsequently, in process 2, the relation between the physical and logical addresses is updated so that the logical address of 102 corresponding to the physical address of 105 in the state shown in FIG. 3A now corresponds to the physical address of 107 pointing to a block, in which the update has been written, as shown in FIG. 3B. As a result, the logical address of 104 corresponding to the physical address of 107 in the state shown in FIG. 3A now corresponds to the physical address of 105 as shown in FIG. 3B.

In this regard, as described before, while a physical address is assigned permanently to a block, a logical address is assigned permanently to data, which is written only temporarily in a block and may thus be moved from the block to another.

As is generally known, a flash memory used as a semiconductor memory device has a life determined by the number of data-erasing operations carried out so far. Thus, by following a step for carrying out data-writing operations (or data-updating operations) as described above, accesses to the same block used as a storage area can be prevented from being made repeatedly and consecutively so that the life of the flash memory can be lengthened.

Then, by re-associating logical addresses with physical addresses in process 2 as described above, from the FAT point of view, data is always pointed to by the same logical address even if the data is actually written into an alternate block as an update of already recorded data. This is because the FAT executes management of files by using logical addresses. Thus, subsequent accesses can be made correctly.

It is to be noted that, for the purpose of simplifying management of updating the logical-physical address conversion table to be described later, the alternate-block process is prescribed to select a replacement bock, in which new data is to be written as described above, among blocks in the same segment. That is to say, an alternate block to serve as a replacement block of a block to be updated is not selected from blocks in a segment other than the segment including the block to be updated.

4: Logical-Physical Address Conversion Table

As shown in FIGS. 3A and 3B, data is written into a replacement block in an alternate-block process, making it necessary to change relations between physical and logical addresses. Thus, in order to implement accesses in operations to read out data from the flash memory 2 and write data therein, a logical-physical address conversion table is required. That is to say, the FAT refers to the logical-physical address conversion table to identify a physical address corresponding to a logical address specified to the FAT and an access can be made to a block pointed to by the identified physical address. Conversely speaking, if such a logical-physical address conversion table is not available, an access to the flash memory 2 through the FAT cannot be made.

Figure 4:
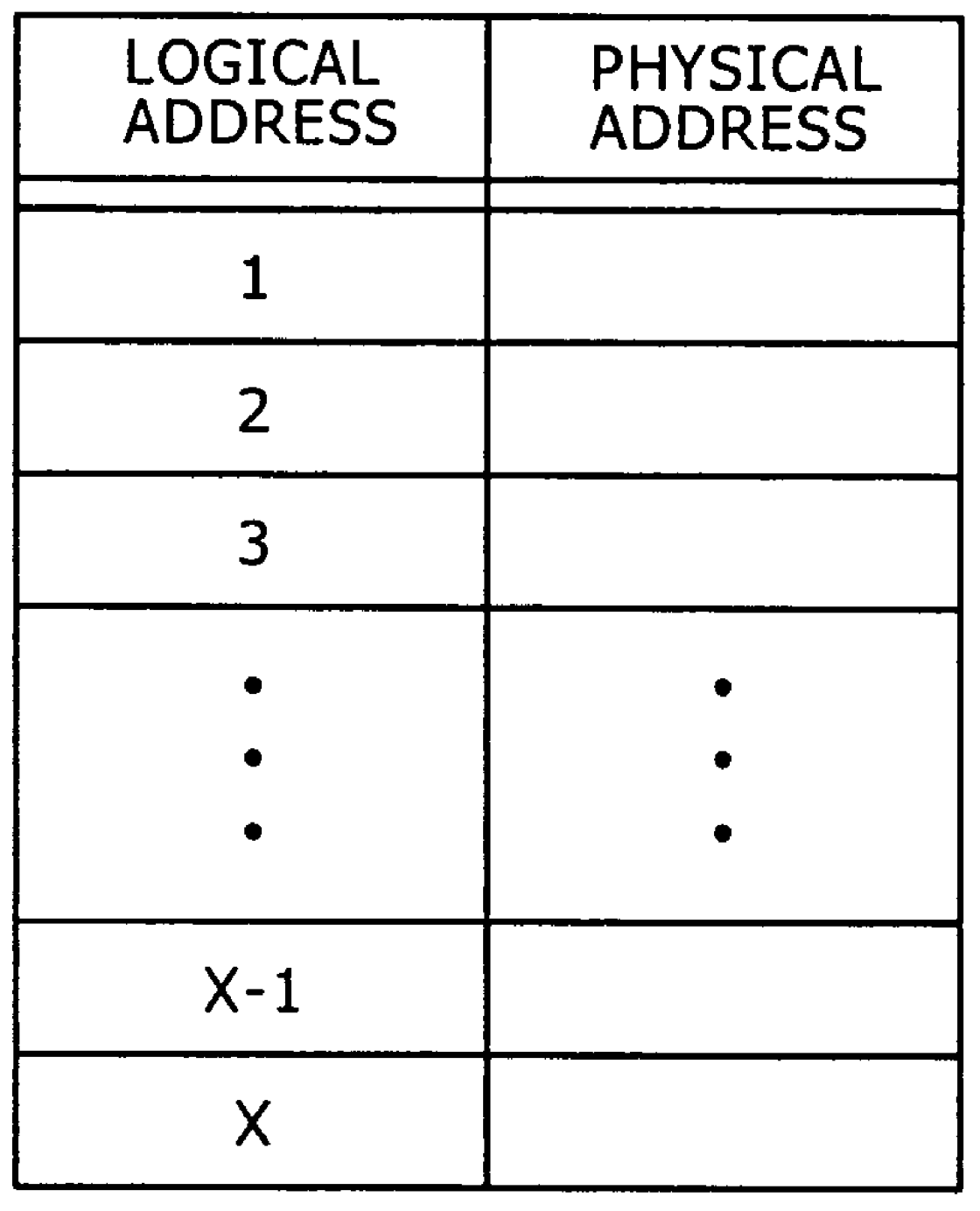

FIG. 4 is a diagram showing the concept of the logical-physical address conversion table.

As shown in the figure, first of all, logical addresses in the logical-physical address conversion table are arranged typically in an ascending order. Then, table information is created in the logical-physical address conversion table as information including pairs each consisting of one of the logical addresses and a physical address corresponding to the logical address.

It is to be noted that, as described above by referring to FIGS. 3A and 3B, if data is to be written into a replacement block in an alternate-block process, the replacement block is selected from blocks in the same segment as the segment including a block, into which the data would otherwise be written. Thus, the logical-physical address conversion table shown in FIG. 4 is provided for each segment.

FIG. 5 is a diagram showing typical association of logical addresses with physical addresses assigned to a plurality of segments composing the flash memory 2.

As shown in the figure, the storage area of the flash memory 2 is divided into four segments, i.e., segments 0 to 3 each having a storage capacity of 512 blocks. Physical addresses in the range 0 to 511 are assigned to segment 0, which is the segment at the beginning of the flash memory 2, and physical addresses in the range 512 to 1,023 are assigned to segment 1 following segment 0. Physical addresses assigned to a segment are addresses of physical blocks composing the segment. Physical addresses in the range 1,024 to 1,535 are assigned to segment 2 following segment 1 and physical addresses in the range 1,536 to 2,047 are assigned to segment 3 following segment 2.

Logical addresses are temporarily associated with the physical addresses, which are assigned permanently to blocks as described above, as follows. Only 490 logical addresses are associated with the physical addresses assigned to one segment. To put it concretely, logical addresses in the range 0 to 489 are associated with segment 0 and logical addresses in the range 490 to 979 are associated with segment 1. Logical addresses in the range 980 to 1,469 are associated with segment 2 and logical addresses in the range 1,470 to 1,959 are associated with segment 3.

Thus, in the logical-physical address conversion table provided for segment 0, the logical addresses in the range 0 to 489 are associated with some of the physical addresses in the range 0 to 511. In the logical-physical address conversion table provided for segment 1, the logical addresses in the range 490 to 979 are associated with some of the physical addresses in the range 512 to 1,023. In the logical-physical address conversion table provided for segment 2, the logical addresses in the range 980 to 1,469 are associated with some of the physical addresses in the range 1,024 to 1,535. In the logical-physical address conversion table provided for segment 3, the logical addresses in the range 1,470 to 1,959 are associated with some of the physical addresses in the range 1,536 to 2,047.

By the way, in accordance with the address association shown in FIG. 5, only 490 logical addresses are associated with a segment in spite of the fact that 512 physical addresses are assigned to the segment. In this regard, the number of logical addresses associated with a segment is smaller than the number of physical addresses assigned to the segment by 22. This is because a segment is prescribed to include a predetermined number of blocks for special applications and/or blocks not used for storing ordinary data, or defects such as bad or unusable areas are recognized in up to a number of blocks. The difference between the number of logical addresses associated with a segment and the number of physical addresses assigned to the segment is actually dependent on the number of bad or defective blocks existing in the segment. Then, actual specifications of the flash memory 2 are taken into consideration on the basis of the dependence of the difference on the number of bad blocks to conclude that a configuration for managing 490 logical blocks per segment is sufficient for managing blocks usable in write and erase operations. It is to be noted that the number of logical addresses associated with a segment can be properly changed. In this regard, the number of logical addresses associated with a segment does not have to be 490.

The logical-physical address conversion table is actually stored in a BMAP, which is management information. A concrete structure of the logical-physical address conversion table is explained as a part of the structure of the BMAP as follows.

5: First Typical BMAP Structure

As management information used for managing blocks of segments in the flash memory 2, a table referred to as a BMAP is provided. The BMAP includes the logical-physical address conversion table. The BMAP is provided for each segment of the flash memory 2, being stored in a certain block of the segment, for which the BMAP is provided.

The structure of the BMAP is explained by referring to FIGS. 6 and 7 below.

It is to be noted that the following description simply assumes the basic format of dividing the storage area into segments each having a size of 512 blocks. FIGS. 6 and 7 are diagrams each showing the structure of a BMAP provided for segment 0 physically located at the beginning of the storage area of the flash memory 2.

The structure of the entire BMAP is shown in FIG. 6(a).

The BMAP is used for information with an amount equivalent to 1 page. Thus, as already explained by referring to FIG. 2(d), the BMAP consists of a data portion and a redundancy portion. In the case of this embodiment, as shown in FIG. 6(a), the data portion has a length of 2,048 bytes and the redundancy portion has a length of 64 bytes. In this regard, a page consisting of such a data portion and a redundancy portion has a fixed total length of 2,112 bytes.

The 2,048-byte data portion of the page structure of the BMAP shown in FIG. 6(a) is an array composed of 1,024 unit areas each having a length of 2 bytes (or 16 bits). That is to say, the data portion consists of unit areas 0 to 1,023.

The logical-physical address conversion table occupies an area of the 9 least significant bits in each of unit areas 0 to 489 of the data portion.

Thus, the area occupied by the logical-physical address conversion table is an array of 490 9-bit unit areas. As shown in FIG. 6(b), the 490 9-bit unit areas are associated with logical addresses of 0 to 489. Each of the 490 9-bit unit areas is used for storing a physical address associated with a logical address associated with the unit area as shown in FIG. 6(c). In this embodiment, each physical address has a length of 9 bits.

As described above, in the configuration of the logical-physical address conversion table, logical addresses are arranged in an ascending order and a physical address is associated with each of the logical addresses in the same way as the logical-physical address conversion table explained before by referring to FIG. 4.

In addition, in the BMAP, an area of the 7 most significant bits in each of unit areas 0 to 511 of the data portion shown in FIG. 6(a) is used as an allocation table for storing physical-block management information as shown in FIG. 6(d).

The allocation table for storing physical-block management information as shown in FIG. 6(d) has a configuration consisting of 512 unit areas each having a length of 7 bits. The 512 unit areas each having a length of 7 bits are located at array positions 0 to 511, which are associated with the physical addresses of 0 to 511 respectively. As shown in FIG. 6(e), a unit area located at an array position associated with a physical address in the range 0 to 511 is an area used for storing 7-bit information on a block pointed to by the physical address. The area used for storing information on a block is referred to as a block information area.

As shown in FIG. 6(e), the 7-bit block information area according to the embodiment is prescribed to include at least a written-status flag and a bad-status flag. In this case, the written-status flag and the bad-status flag each have a length of 1 bit. The written-status flag and the bad-status flag are provided at respectively the first and second bit positions of the block information area. Of course, the format shown in FIG. 6(e) as the format of the block information area is a typical format. For example, the written-status flag as well as the bad-status flag can each have a length other than 1 bit, and they can be provided at bit positions other than the first and second bit positions of the block information area.

A written-status flag set at 0 or 1 indicates whether or not data has been written into or erased from a block pointed to by a physical address associated with the block information area containing the flag.

On the other hand, a bad-status flag set at 0 or 1 indicates whether or not a block pointed to by a physical address associated with the block information area containing the flag is bad (or defective) block.

In addition, as described earlier, in the course of a data-writing process carried out to typically update data already stored in the flash memory, for example, the power supply may be interrupted or the semiconductor storage apparatus may be pulled out from the drive so that the data-writing process is discontinued. In such a case, for example, when the semiconductor storage apparatus is activated again later, the storage status of physical data in the actual flash memory may not match the management information stored typically in the BMAP. With the storage status of physical data in the actual flash memory not matching the management information, in subsequent operations, it is quite within the bounds of possibility that subsequent operations such as normal data management and subsequent data accesses to the flash memory cannot be carried out correctly.

In such a case, by reconstruction the management information stored typically in the BMAP, subsequent operations such as normal data management and data accesses to the flash memory can be executed and made correctly. In order to reconstruct the management information stored typically in the BMAP, however, it is necessary to produce a result of suspension determination typically when the semiconductor storage apparatus 1 is activated. The suspension determination is determination as to whether or not the last data-writing operation has been suspended.

For the reason described above, in the case of the embodiment, the structure of the BMAP includes a reserved-block address area defined as shown in FIG. 6(f).

The reserved-block address area is an area used for storing the physical address of a block into which data is to be written in the next write operation. The size of the reserved-block address area is 9 bits, being equal to the size of the physical address.

Such a reserved-block address area having a size of 9 bits is provided at any location in a region starting from the $490^{th}$ unit area.

As an alternative, the reserved-block address area having a size of 9 bits can be provided in the redundancy portion. In the structure shown in the figure, the reserved-block address area is provided at the beginning of the redundancy portion. In actuality, however, the location of the reserved-block address area can be prescribed to be any location in the redundancy portion as long as the location is properly separated from other information stored in the redundancy portion.

It is to be noted that a later description will explain how the reserved-block address area is used in a suspension determination process.

Figure 6:
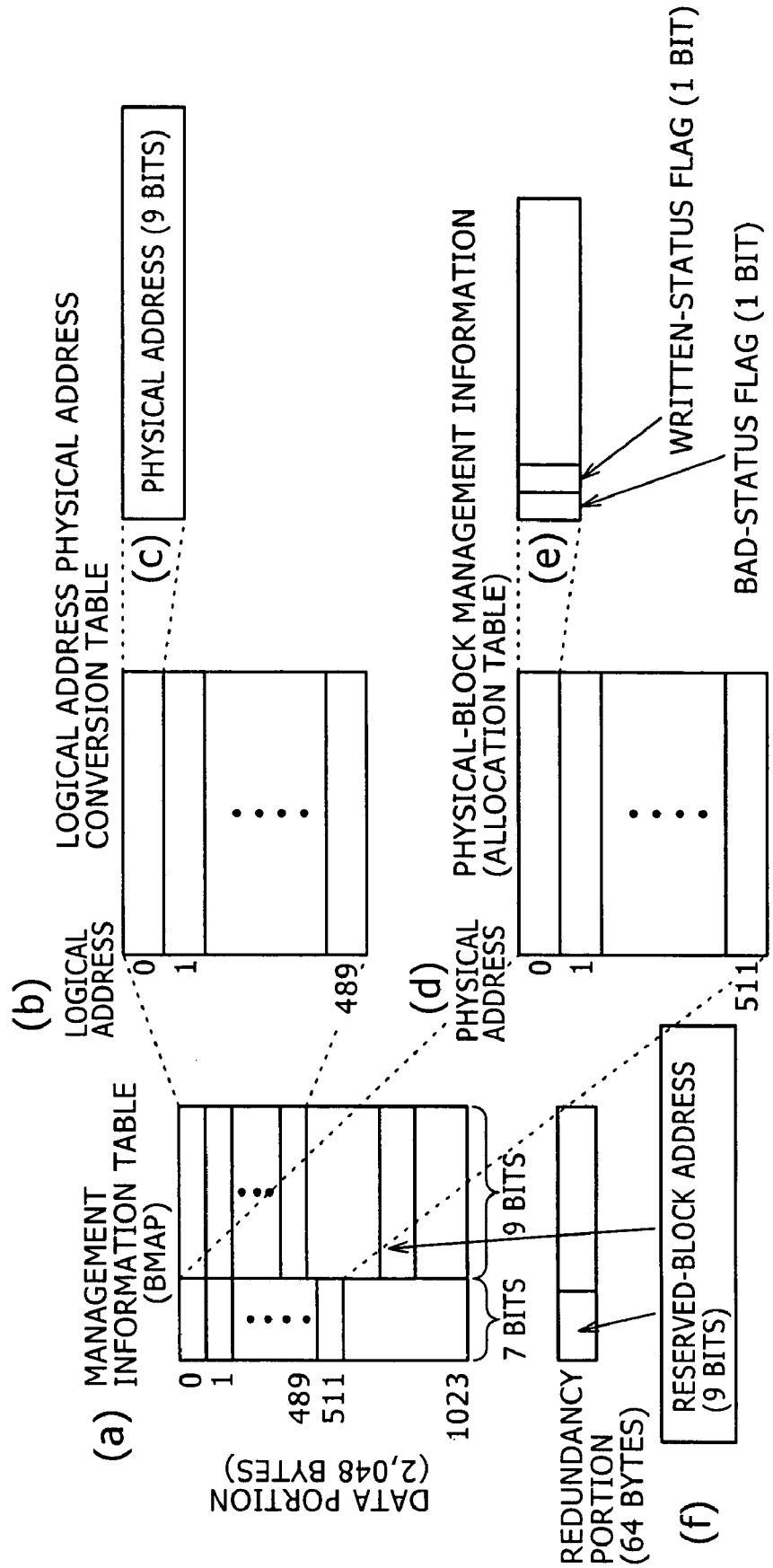
FIG. 6 is a diagram showing a typical data structure of a BMAP used for storing management information including the logical-physical address conversion table.

As for a BMAP provided for any of subsequent segments starting with segment 1, logical addresses associated with 9-bit units areas as shown in FIG. 6(b) and physical addresses associated with 7-bit unit areas shown in FIG. 6(d) are obtained by adding an offset according to a subsequent segment to every address assigned to segment 0 as shown in FIG. 6. That is to say, an offset of 490×M is added to every logical address associated with segment 0 and an offset of 512×M is added to every physical address assigned to segment 0 where notation M is a natural number used as a segment number assigned to the subsequent segment. As a result, the logical and physical addresses have values in the ranges shown in FIG. 5. In the case of segment 1 following segment 0, for example, the logical addresses shown in FIG. 6(b) are in the range 490 to 979 whereas the physical addresses shown in FIG. 6(d) are in the range 512 to 1,023.

6: Second Typical BMAP Structure

The structure of the BMAP is not limited to the one shown in FIG. 6. Another typical structure of the BMAP is shown in FIG. 7.

In the first place, the data portion of the page structure in the BMAP shown in FIG. 7(a) is an array of 1-byte unit areas in the byte-position range 0 to 2,047. The logical-physical address conversion table occupies a 552-byte area ranging from byte position 0 to byte position 551 in this data portion. The logical-physical address conversion table is constructed into a structure like the one shown in FIG. 2(b).

The 552-byte area ranging from byte position 0 to byte position 551 is divided into 9-bit unit areas. As a result of the division, 490 unit areas each having a size of 9 bits are obtained. Each of the 490 unit areas each having a size of 9 bits is associated with one of logical addresses in the range 0 to 489. That is to say, the logical addresses of 0 to 489 arranged in the ascending order are associated sequentially with the 490 unit areas each having a size of 9 bits.

Figure 7:
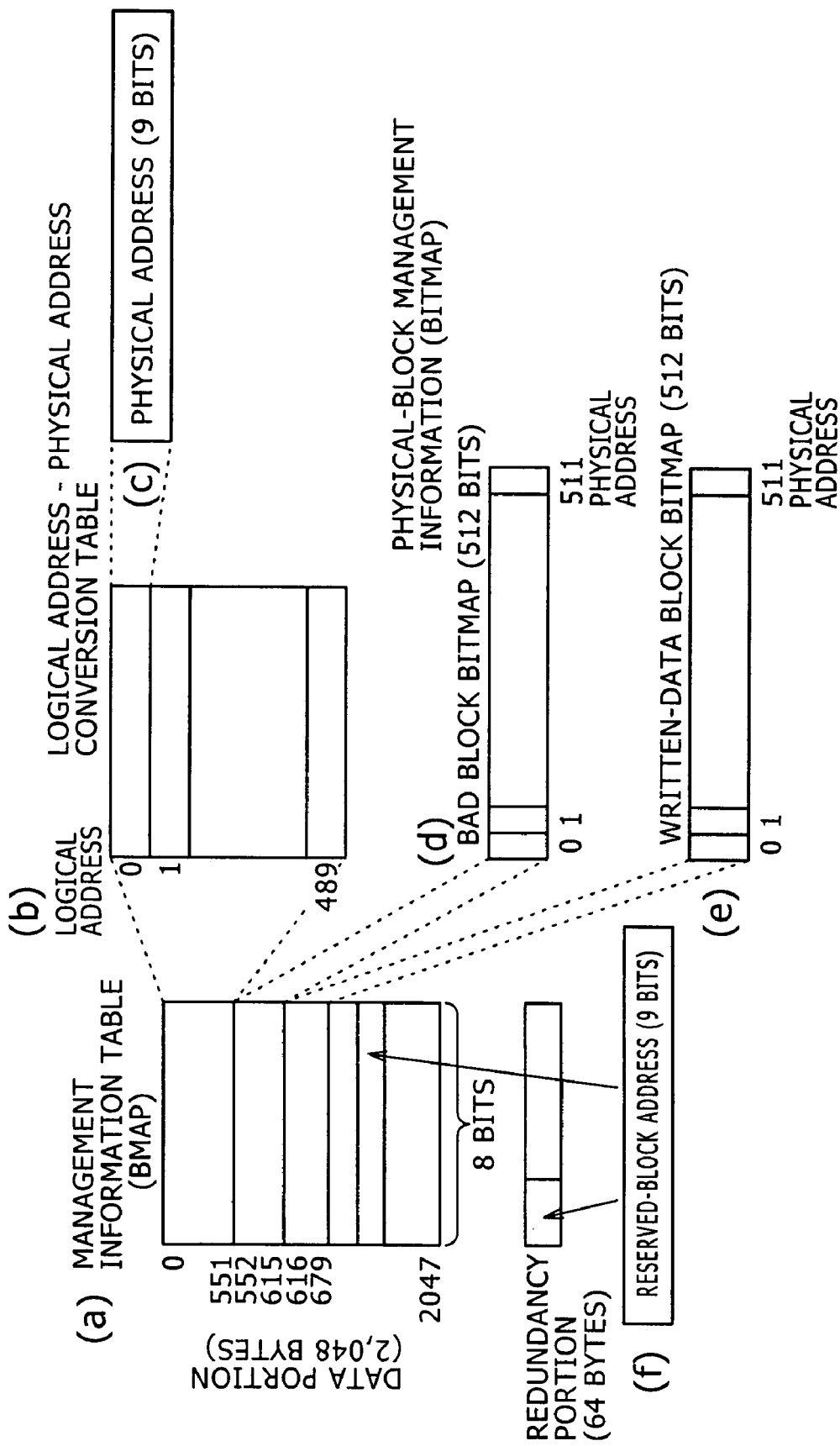
FIG. 7 is a diagram showing another typical data structure of the BMAP.

As shown in FIG. 7(c), each of the 490 unit areas each having a size of 9 bits is used for storing a physical address corresponding to the logical address associated with the unit area. In this way, the logical-physical address conversion table shown in FIG. 7 is created into a structure in which logical addresses arranged in the ascending order are associated with physical addresses.

Physical-block management information consists of a bad block bitmap shown in FIG. 7(d) and a written-data block bitmap shown in FIG. 7(e). In this regard, the physical-block management information is stored in information areas in bitmap formats.

The bad block bitmap shown in FIG. 7(d) is provided in a 64-byte (or 512-bit) area at byte positions 552 to 615 in the data portion of the BMAP shown in FIG. 7(a).

The 512 bits forming the bad block bitmap are sequentially associated with physical addresses of 0 to 511 respectively with the first bit associated with the physical address of 0. That is to say, the 512 bits forming the bad block bitmap are sequentially associated with blocks pointed to by physical addresses of 0 to 511 respectively with the first bit associated with a block pointed to by the physical address of 0 and the last one associated with a block pointed to by the physical address of 511. A bit set at a value of 0 or 1 indicates whether or not the block pointed to by a physical address associated with the bit is bad.

By the same token, the written-data block bitmap shown in FIG. 7(e) is provided in a 64-byte (or 512-bit) area at byte positions 616 to 679 in the data portion of the BMAP shown in FIG. 7(a). In the data portion of the BMAP, the written-data block bitmap follows the bad block bitmap.

The 512 bits forming the written-data block bitmap are sequentially associated with physical addresses of 0 to 511 respectively with the first bit associated with the physical address of 0. That is to say, the 512 bits forming the written-data block bitmap are sequentially associated with blocks pointed to by physical addresses of 0 to 511 respectively with the first bit associated with a block pointed to by the physical address of 0 and the last one associated with a block pointed to by the physical address of 511. A bit set at a value of 0 or 1 indicates whether or not data has been written into the block pointed to by a physical address associated with the bit.

A reserved-block address area shown in FIG. 7(f) is prescribed to be a 9-bit area starting from a predetermined bit position in a predetermined byte array starting at the 680$^{th}$ byte position in the data portion.

As an alternative, much like the reserved-block address area shown in FIG. 6, the reserved-block address area having a size of 9 bits can be provided in the redundancy portion.

It is to be noted that, much like the BMAP shown in FIG. 6, as for a BMAP shown in FIG. 7 as a BMAP provided for any of subsequent segments starting with segment 1, logical addresses associated with 9-bit unit areas of an area shown in FIG. 7(b), physical addresses associated with 512 bits of the bad block bitmap shown in FIG. 7(d) and physical addresses associated with 512 bits of the written-data block bitmap shown in FIG. 7(e) are obtained by adding an offset according to a subsequent segment to every address assigned to segment 0 as shown in FIG. 7.

In addition, the structure of the BMAP is not limited to those shown in FIGS. 6 and 7. The structure of the BMAP can be modified properly to any structure as long as it is possible to execute management of information such as addresses of BMAPs provided for segments, information on bad blocks and written-data blocks in segments and the physical address of a reserved block.

7: SMAP

In accordance with what has been described before, if it is necessary to carry out a process to update data in blocks including a block used for storing the BMAP, the alternate-block processing explained earlier by referring to FIGS. 3A and 3B is performed for all the blocks including the block used for storing the BMAP without exception. As a result of such alternate-block processing, a block included in a segment as the block used for storing the BMAP becomes indeterminate.

In order to solve this problem, it is necessary to provide a mechanism for allowing the address of an indeterminate block used for storing the BMAP to be acquired. With such a mechanism, the BMAP can be utilized in processes such as an operation carried out by the file system to refer to the BMAP.

As a conceivable mechanism for allowing the address of an indeterminate block used for storing the BMAP to be acquired, first of all, a step is executed to read out physical blocks from every segment in, for example, the physical-address order and search the blocks for a page used for storing the BMAP. Since the redundancy portion of the page used for storing the BMAP should include information showing that the page is a page used for storing the BMAP, the location of the BMAP can be recognized by referring to this information.

However, such a step raises a problem that, the more rear the storage position of the BMAP in a segment, the longer the time to search the segment for the BMAP.

In order to solve the problem, the embodiment provides system management information referred to as an SMAP as management information used for managing BMAPs.

In providing this SMAP, in the first place, the embodiment defines a system segment having a predetermined storage capacity as a segment in the flash memory 2. For example, the system segment is provided in an area at the beginning of the flash memory 2 as shown in FIG. 2(a).

In the second place, the SMAP is stored in this system segment. It is to be noted that, as will be described later, the SMAP prescribed in the embodiment is data of 1 page.

It is also worth noting that, if a system segment is prescribed as is the case with the embodiment, other ordinary segments are each referred to as a data segment in order to distinguish the other ordinary segments from the system segment.

The storage capacity of the system segment is 72 blocks ranging from blocks 0 to 71. The storage capacity of the system segment is set at a value smaller than the segment storage capacity, which is prescribed to be 512 blocks as a rule, because of the following reason.

In the first place, much like the BMAP, the block of the SMAP may also be subjected to an alternate-block process in a data-updating operation. As a result of such an alternate-block process, a block included in a segment as the block used for storing the SMAP also becomes indeterminate.

As will be evident from a later description, by referring to the SMAP, the address of the BMAP can be identified. Thus, the operation to search a segment for the BMAP can be carried out at a high speed and a stable manner. It is necessary, however, to carry out an operation to read out data from the system segment in block units in order to search the system segment for the SMAP serving as high-layer management information of the BMAP at, for example, the activation time. In this case, if the system segment is also prescribed to have a storage capacity of 512 blocks in accordance with the same rule as that applied to the data segments, it will inevitably take a long time to search the system segment for the position of the SMAP.

In order to solve this problem, in the case of the embodiment, the storage capacity of the system segment is set at a proper block count smaller than 512 so as to shorten the time to search the system segment for the position of the SMAP.

It is to be noted that, while the storage capacity of the system segment is set at 72 blocks in the embodiment, this number is just typical to the bitter end. It is nice to prescribe the storage capacity of the system segment at a proper value by considering not only the search time described above, but also other factors such as the amount of information to be stored in the system segment, the frequency to update the information and balance with a limit on the number of allowable erase operations (or balance with the life of the flash memory 2).

In addition, if the provided system segment has a storage capacity of 72 blocks as shown in FIG. 2(*a*), an area remaining in segment 0, which exists at the beginning of the storage area of the flash memory 2, as a data segment includes 440 blocks, i.e., blocks 72 to 511.

That is to say, the system segment occupies the first 72 blocks of the segment physically located at the beginning of the storage area of the flash memory 2, that is, the first 72 blocks of segment 0 having 512 blocks at block addresses 0 to 511 respectively. It is to be noted that remaining segments 1 to M each have a storage capacity of 512 blocks as a rule.

On the assumption that every segment has a size of 512 blocks, the flash memory 2 according to the embodiment normally has a total storage capacity of n×512 blocks where notation n is a natural number denoting the number of segments included in the flash memory 2. Thus, by splitting segment 0 having a size of 512 blocks into the system segment and the remaining area and by using the remaining area as an area of a data segment as described before, the system and data segments composing the entire storage area of the flash memory 2 can be used with a high degree of efficiency.

It is to be noted that since segment 0 having a size of 512 blocks is split into the system segment and the remaining area, the BMAP of segment 0 has a management format different from those of the BMAPs shown in FIGS. 6 and 7. Let us take the BMAP shown in FIG. 6 as an example. In this case, only some of the 7-bit areas used for storing the physical-block management information shown in FIG. 6(*d*) are utilized. To put it concretely, for example, only the 7-bit areas corresponding to physical addresses of 72 to 511 are utilized. In addition, for example, only logical addresses in the range 72 to 489 are used. That is to say, a logical-address range narrower than the range 0 to 489 can be set.

Figure 8:
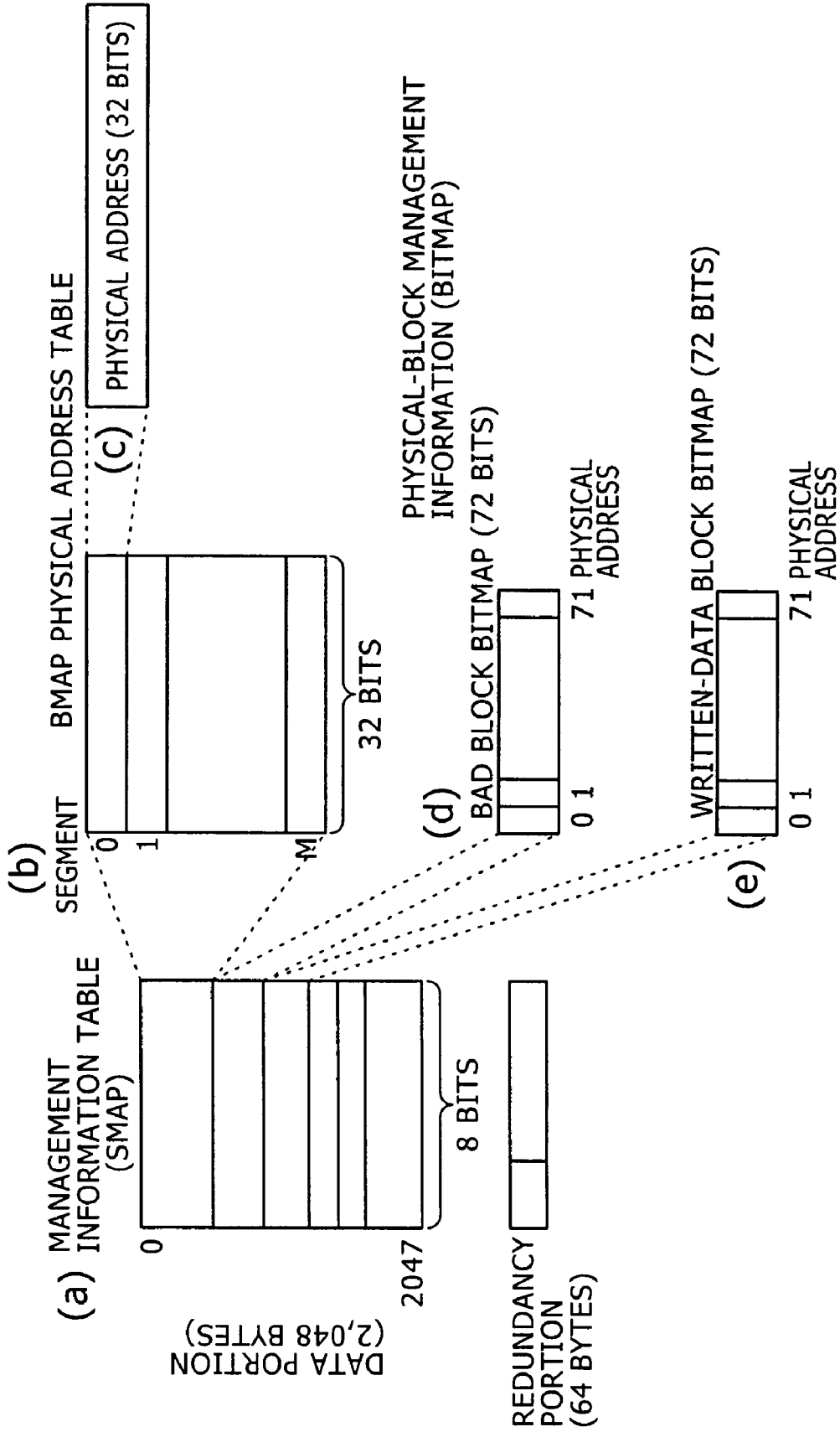
FIG. 8 is a diagram showing a typical data structure of an SMAP used for storing system management information table used for managing BMAPs.

The SMAP stored in the system segment has a typical structure shown in FIG. 8.

As shown in FIG. 8(*a*), much like the BMAP, the SMAP is used for storing information having an amount of one page, which typically includes a data portion having a size of 2,048 bytes and a redundancy portion with a size of 64 bytes. In the SMAP page structure shown in FIG. 8(*a*), the data portion is an array of 1-byte unit areas forming a structure composed of bytes 0 to 2,047.

An area in the data portion is used for storing a BMAP physical-address table shown in FIG. 8(*b*). The area starts from byte 0 of the data portion and has a required size equivalent to the size of the BMAP.

The BMAP physical-address table shown in FIG. 8(*b*) is an array of 32-bit unit areas. The number of 32-bit unit areas in the array is M, which is the number of data segments in the flash memory 2. Segment numbers 0 to M are assigned respectively to the 32-bit unit areas starting with the one on the top of the array. That is to say, each of the 32-bit unit areas is associated with a segment. Each of the 32-bit unit areas is used for storing a physical address shown in FIG. 8(*c*) as the physical address of a block used for storing the BMAP of a segment indicated by a segment number associated with the 32-bit unit area.

Thus, by referring to the BMAP physical-address table having such a structure, for example, the file system is capable of identifying the physical address of a block used for storing a BMAP provided for a segment or a data segment.

In addition, the SMAP described above is also used for storing physical-block management information for managing 72 blocks located at physical addresses 0 to 71 as blocks composing the system segment. In the case of the embodiment, the physical-block management information occupies two information areas used respectively for storing a bad block bitmap shown in FIG. 8(*d*) and a written-data block bitmap shown in FIG. 8(*e*) in a bitmap format.

The bad block bitmap shown in FIG. 8(*d*) is a 9-byte (72-bit) area following the BMAP physical-address table in the data portion of the SMAP shown in FIG. 8(*a*). The 72 bits of the bad block bitmap are associated sequentially with physical addresses of 0 to 71 respectively with the first bit associated with the physical address of 0. That is to say, the 72 bits of the bad block bitmap, which start with the first bit and end with the last bit, are associated with physical blocks pointed to by the physical addresses of 0 to 71 respectively with the first bit associated with a block pointed to by the physical address of 0 and the last one associated with a block pointed to by the physical address of 71. A bit set at a value of 0 or 1 indicates whether or not the block pointed to by a physical address associated with the bit is bad.

By the same token, the written-data block bitmap shown in FIG. 8(*e*) is provided in a 9-byte (or 72-bit) area in the data portion of the SMAP shown in FIG. 8(*a*). In the data portion of the SMAP, the written-data block bitmap follows the bad block bitmap.

The 512 bits forming the written-data block bitmap are sequentially associated with physical addresses of 0 to 71 respectively with the first bit associated with the physical address of 0. That is to say, the 72 bits forming the written-data block bitmap are sequentially associated with blocks pointed to by physical addresses of 0 to 71 respectively with the first bit associated with a block pointed to by the physical address of 0 and the last one associated with a block pointed to by the physical address of 71. A bit set at a value of 0 or 1 indicates whether or not data has been written into the block pointed to by a physical address associated with the bit.

It is to be noted that, since the system management information table is used for managing BMAPs of segments, it is not necessary to provide the physical address of a reserved block.

In addition, much like the BMAP, the structure of the SMAP is not limited to that shown in the figure. The structure of the SMAP can be modified properly to any structure as long as it is possible to execute management of information such as addresses of BMAPs provided for segments, information on bad blocks and written-data blocks in segments and the physical address of the reserved block.

8: Data-Writing (Updating) Processing Step 8-1: Writing User Data

In addition, the embodiment provides different processing steps for writing/updating one page management information and user data. The one page management information includes the SMAP and the BMAP, which have been described above.

In the first place, a process to write data onto the flash memory 2 is carried out by performing alternate-block processing explained earlier by referring to FIGS. 3A and 3B. A concrete step for carrying out the process to write data onto the flash memory 2 is explained by referring to FIGS. 9A to 9D.

The left side of FIGS. 9A to 9D shows an updating-object block, data already written in which is to be updated. On the other hand, the right side of FIGS. 9A to 9D shows a new block (or a writing-object block). The new blocks are each a block selected from already erased-data blocks as a block into which new data is to be written.

Figure 9A:
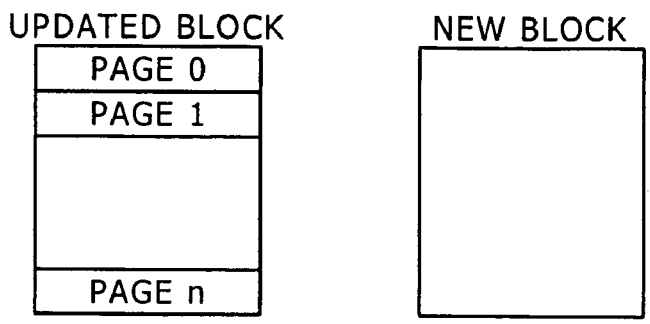
FIGS. 9A to 9D are diagrams showing a model of a data-updating process entailing alternate-block processing.

FIG. 9A is a diagram showing a model of a typical state in which a new block has been determined prior to a data-updating process. As shown in the figure, an updating-object block contains pre-updating data stored in three pages, i.e., pages 0, 1 and n located at three page positions. Pre-updating data is data already stored in the block prior to the data-updating process. In addition, at this stage, data has been erased from the new block. It is to be noted that page 0 is a typical page position showing the pre-updating data other than pages 0 and n. In actuality, page positioned other than the updating-object page can also be pre-updating data.

Figure 9B:
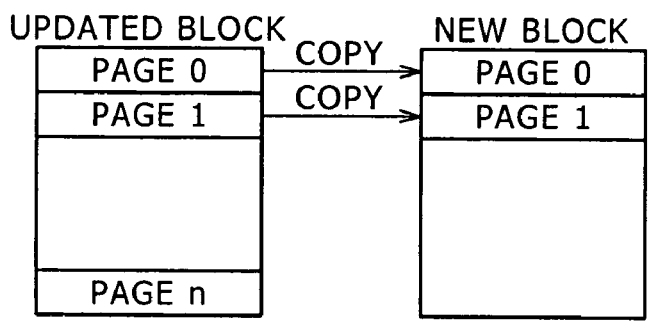

As the data-updating process is carried out in this state, first of all, data stored in pages 0 and 1 of the updating-object block is copied to the new block as shown in FIG. 9B. At that time, the data is written into pages 0 and 1 of the new block. The copied data is referred to as previous page data. On the other hand, new data to be newly written into the new block is referred to as new write data to be described below.

Figure 9C:
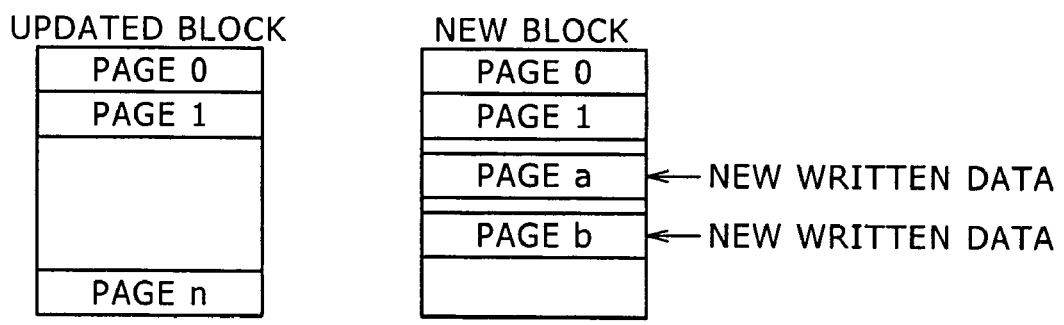

Then, after the previous page data has been written into (or copied to) the new block, new page data is newly added to the previous page data as data of pages a and b of the new block as shown in FIG. 9C. As shown in the figure, pages a and b are located below page 1.

After the new write data has been written in pages a and b as described above, data below page b is copied from the updating-object block to the new block. To put it concretely, data of page n at the end of the updating-object block is copied to page n of the new block as shown in FIG. 9D.

Such a data-updating step can be regarded as a step properly executed to copy data from the updating-object block to the new block in page units in an order of increasing page numbers starting with the smallest page number and ending at the largest one. Thus, in dependence on the states of the pre-updating data and the new data, the step for writing the new data into the new block may be executed on page units overlapping page units, which serve as a target of the step for copying data from the updating-object block to the new block.

Figure 9D:
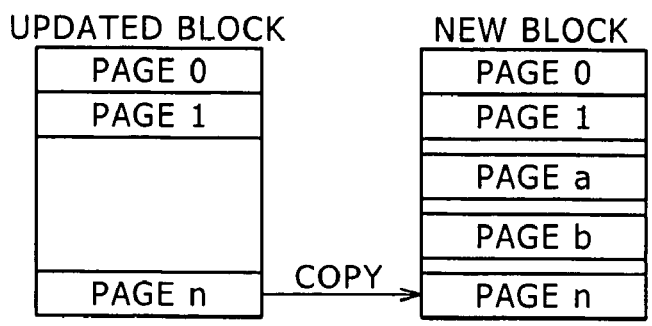

In addition, in the case of the step for carrying out a process to write data onto the flash memory 2 as shown in FIGS. 9A to 9D, at the stage the new block enters the state shown in FIG. 9D, the operation to store the new data into the new block is completed. With a predetermined timing after the completion of the operation to store the new data into the new block, the data stored in the updating-object block as shown on the left side of FIGS. 9A to 9D is erased. The process to erase the data stored in the updating-object block is not shown in the figure though. That is to say, the updating-object block is replaced with the new block used as an alternate block as a result of the process to write data onto the flash memory 2.

To reflect a result of the alternate-block operation described above, information stored in the BMAP shown in FIG. 6 or 7 is updated. First of all, since new data has been written into the new block, the logical-physical address conversion table shown in FIG. 6(b) or 7(b) is updated by cataloging the physical address of the new block used for storing the new data in a table entry associated with the logical address assigned to the new data.

Then, as a result of the alternate-block operation, the written status of the updating-object block is changed to erased-data status while the erased-data status of the new block is changed to written-data status. Thus, the physical-block management information is updated in accordance with the alternate-block operation.

In the case of the BMAP shown in FIG. 6, the status flag of the physical-block management information shown in FIG. 6(e) as management information associated with the physical address of the updating-object block is changed from a value representing the written-data status to a value representing the erased-data status. On the other hand, the status flag of the physical-block management information shown in FIG. 6(e) as management information associated with the physical address of the new block is changed from a value representing the erased-data status to a value representing the written-data status.

In the case of the BMAP shown in FIG. 7, on the other hand, the written-data block bit map shown in FIG. 7(e) is updated. To put it concretely, the bit associated with the physical address of the updating-object block is changed from a value representing the written-data status to a value representing the erased-data status while the bit associated with the physical address of the new block is changed from a value representing the erased-data status to a value representing the written-data status.

In addition, in this embodiment, as a result of the alternate-block operation, the reserved-block address shown in FIG. 6(f) or 7(f) is also updated as will be described later.

8-2: Writing Management Information (SMAP and BMAP)

Figure 10A:
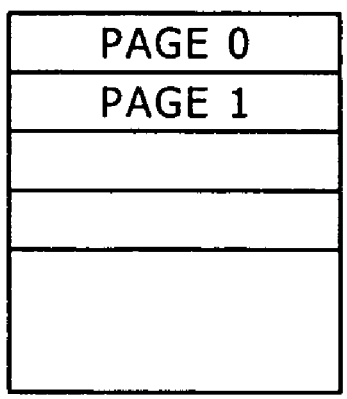
FIGS. 10A and 10B are diagrams showing a process to update management information such as the SMAP and a BMAP for a block.
Figure 10B:
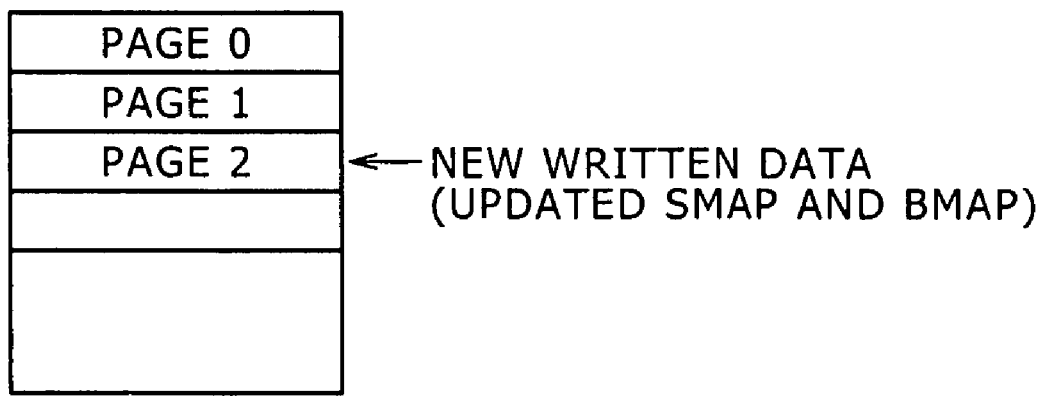

Next, a processing step for writing (or updating) management information such as the SMAP and the BMAP is explained by referring to FIGS. 10A and 10B.

As also described so far, data is erased from the flash memory 2 in block units each referred to as an erasure unit and data is written into the flash memory 2 in page units each referred to as a write unit. In addition, as explained earlier by referring to FIGS. 6, 7 and 8, the SMAP and the BMAP are each management information having an amount of one page. With these facts kept in mind, a process shown in FIGS. 10A and 10B as the processing step for writing (or updating) management information is explained. In addition, in the explanation of the processing step shown in FIGS. 10A and 10B, it is assumed that a BMAP is updated. A processing step for writing (or updating) the SMAP is the same as the processing step for writing (or updating) a BMAP.

FIG. 10A is a diagram showing a state, in which data has been written into pages 0 and 1 of a pre-updating block, as a written-data state. The pieces of data stored in pages 0 and 1 are each a BMAP. The data stored in page 0 is a less recent BMAP. The data stored in page 1 following page 0 is an updated BMAP obtained as a result of updating the BMAP stored in page 0. Thus, the BMAP stored in page 1 is the most recent BMAP and hence the effective BMAP.

Then, for example, user data is updated in an alternate-block process. In this case, the BMAP is also updated by newly writing an updated BMAP into page 2 following page 1 as shown in FIG. 10B.

In a process to update a BMAP in this embodiment, an updated BMAP is incrementally written as a new page in a block in an order of increasing page numbers. By updating the BMAP in this way, at a stage the BMAP has been updated as many times as pages in the block, all the pages in the block are in a state of being used up. If the BMAP needs to be further updated in this state, the BMAP is updated by carrying out an alternate-block process on the block containing the BMAP. That is to say, a new block is found as an alternate block and an updated BMAP is written in page 0 of the alternate block. Then, all pre-updating BMAPs are erased from the previous block.

As is evident from the above process of updating management information such as the SMAP or a BMAP, an alternate-block process needs to be carried out once every M processes to update the SMAP or the BMAP where notation M denotes the number of pages composing a block. In this regard, management information is erased from a block only once after the management information in the block has been updated M times. Thus, the life of the flash memory 2 can be lengthened by a period corresponding to a decrease in erasure operation count. As is evident from the descriptions given so far, the SMAP and the BMAP, which are used as management information, are updated frequently. In particular, since the BMAP is updated every time user data is updated, the frequency of updating the management information (particularly, the BMAP) is equal to the average frequency of updating user data. Thus, since management information is erased from a block not frequently, the feature of the flash memory 2 is very advantageous for the effort made to lengthen the life of the flash memory 2.

In addition, by adoption of the processing step for updating management information such as the SMAP and a BMAP as shown in FIGS. 10A and 10B, as described above, the SMAP can be updated even less frequently than a BMAP.

In this regard, the BMAP physical-address table shown in FIGS. 8(*b*) and 8(*c*) as a table in the SMAP is used for managing the locations of BMAPs. While a physical address in the BMAP physical-address table points to the location of a BMAP in a block as is understood with ease, the physical address in the BMAP physical-address table does not indicate the location of the BMAP at a page level. That is to say, the locations of the BMAPs are managed at a level not deeper than a block level or the management of the BMAP locations is not executed at the page level. Thus, the BMAP physical-address table of the SMAP is updated only when a process to update a BMAP entails an alternate-block process. Thus, the SMAP is updated much less frequently than a BMAP.

In addition, as described above, even if the management of BMAPs is executed in the SMAP at the block level, an operation to make an access to a BMAP can be completed in a short period of time.

In this regard, as a step for making an access to a BMAP, first of all, the BMAP physical-address table in the SMAP is referred to identify a block used for storing the most recent and effective BMAP. Then, an access to the BMAP is made.

Subsequently, if the step for updating management information as shown in FIGS. 10A and 10B is adopted, the most recent and effective BMAP is a BMAP in an unerased page of the block. The page containing the most recent and effective BMAP is a page in which data has been written. To be more specific, the page containing the most recent and effective BMAP cannot be other than the last one among pages in which data has been written. Thus, after the access to the block containing the BMAP is made, the data of pages is read out sequentially one page after another, starting with the page located at the beginning of the block. Eventually, an access can be made to the last one among pages, in which data has been written, to acquire the effective BMAP. In accordance with a prescription, since the number of pages in a block is typically about 64 and the size of a page is typically 2,112 bytes, the operation to search a block for the page containing the most recent and effective BMAP can be completed in a very short period of time in comparison with an operation to search a segment consisting of 512 blocks for such a BMAP. Thus, the processing load can be reduced.

9: Processing Operations 9-1: Data-Writing Processing

Figure 11:
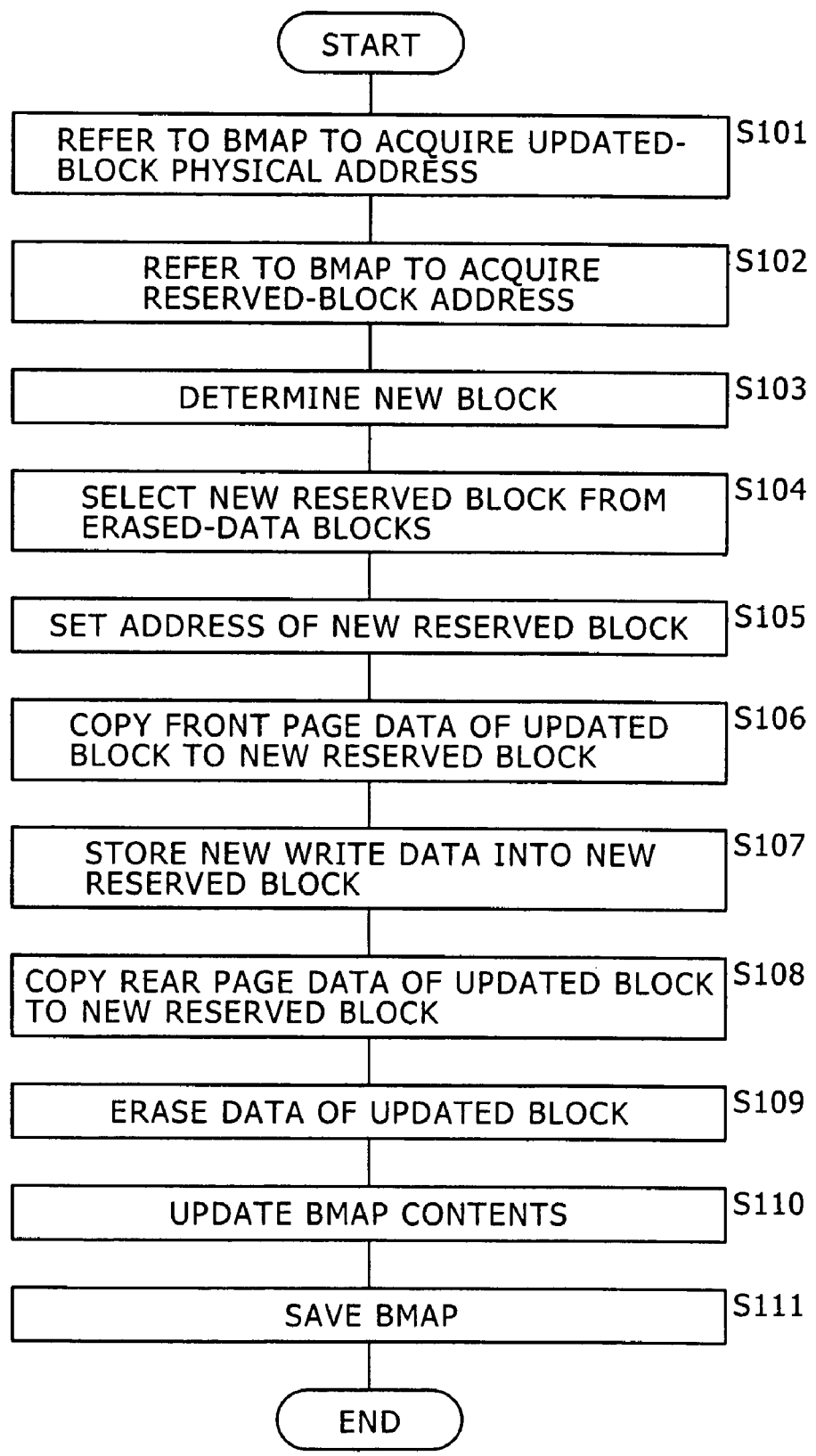
FIG. 11 shows a flowchart representing processing operations carried out in a process to write data into the flash memory (or update data in the flash memory) in accordance with the embodiment.

Next, by referring to a flowchart shown in FIG. 11, the following description explains processing carried out by the data-processing section 3 employed in the semiconductor storage apparatus 1 according to the embodiment to write user data onto the flash memory 2. As described earlier by referring to FIG. 1, the data-processing section 3 is typically a microcomputer. Thus, the processing represented by the flowchart shown in FIG. 11 is carried out by a CPU employed in the microcomputer of the data-processing section 3 through execution of a program stored in a memory such as a ROM embedded in the microcomputer. Pieces of processing represented by flowcharts shown in FIGS. 12 and 13 to be described later are carried out in the same way as the processing represented by the flowchart shown in FIG. 11.

In addition, it is assumed that a BMAP required in execution of the processing represented by the flowchart shown in FIG. 11 has been read out from the flash memory 2 employed in the semiconductor storage apparatus 1 by completing an access to the flash memory 2 and stored for example in an internal RAM embedded in the data-processing section 3.

First of all, the data-processing section 3 carries out a process at a step S101 to start updating of data stored in a certain block. In this case, the data-processing section 3 refers to the logical-physical address conversion table shown in FIG. 6(*b*) or 7(*b*) as a table included in the BMAP stored for example in the internal RAM in order to acquire the physical address of the block, the data of which is currently to be updated.

Then, in a process carried out at the next step S102, a reserved-block address shown in FIG. 6(*f*) or 7(*f*) is read out from the same BMAP.

The physical address of a reserved block is an address to be used as a management information item in a suspension determination process to be described later. The physical address of a reserved block is the address of an alternate block into which data is to be written in the next write processing. That is to say, the physical address of a reserved block is the physical address of a new block shown in FIGS. 9A to 9D to serve as a block into which data is to be written in the next data-updating operation.

The value of the reserved-block address acquired from the BMAP in the process carried out at the step S1102 is set in the last processing to write data immediately before the present data-writing processing. Thus, the value of the reserved-block address acquired in the process carried out at the step S102 is the physical address of a new block, in which new data is to be written in the present data-writing processing, which is the data-updating operation next to the last processing. Then, in a process carried out at the next step S103, the physical address of a reserved block is taken as the physical address of the present new block.

Subsequently, in a process carried out at the next step S104, a new reserved block is selected from blocks presently in an erased-data state in accordance with a predetermined rule by, for example, utilizing the block management information of the BMAP stored in the internal RAM.

In the case of the BMAP shown in FIG. 6, for example, the written-status flag shown in FIG. 6(e) of information stored in each 9-bit unit area corresponding to a physical address in the physical-block management table shown in FIG. 6(d) can be referred to in order to determine the erased-data status of a block pointed to by the physical address. Then, as described above, a new reserved block is selected from blocks presently in an erased-data state.

In the case of the BMAP shown in FIG. 7, on the other hand, the written-data block bitmap shown in FIG. 7(e) is referred to identify blocks presently in an erased-data state and determine a new reserved block in the same way as the BMAP shown in FIG. 6.

Then, in a process carried out at the next step S105, the address of the new reserved block determined in the process carried out at the step S104 is set as the address of a new reserved-block to reflect the result obtained in the process carried out at the step S104. To put it concretely, the physical address of the new reserved block determined in the process carried out at the step S104 is stored in an area allocated in the structure of the BMAP stored in the internal RAM as an area used for storing the physical address of a reserved block.

It is to be noted that, for the purpose of verifying what has been explained above, the following statement is repeated: at this stage, the address of the new reserved block has not been set (or written) yet in the BMAP stored in the flash memory 2.

Subsequently, in a process carried out at the next step S106, some of page data is copied from the updating-object block to a new block as explained earlier by referring to FIG. 9B.

Then, at the next step S107, a process is carried out to incrementally store new write data into the new block in page units as explained earlier by referring to FIG. 9C.

Subsequently, at the next step S108, a process is carried out to copy rear-page data stored in the updating-object block to the new block as explained earlier by referring to FIG. 9D.

It is to be noted that, in order to make the description easy to understand, the processes carried out at the steps S106 to S108 are explained by associating the processes with the concrete processes in the flow shown in FIGS. 9A to 9D. In processing to actually write data into a new block, however, first of all, data is properly copied from an updating-object block to the new block in page units in an order of increasing page numbers starting with a smallest one and, then, new data is written into the new block in page units. Thus, in order to carry out the processing to actually write data into a new block in page units, a program is executed.

By carrying out the processes up to the step S108, the operations to write updated data into the new block can be completed. Then, the flow of the processing goes on to a step S109 at which a process is carried out to erase data from a block treated as the updating-object block in the processes carried out so far. At this stage, the physical alternate-block processing accompanying the data-updating operations carried out on the flash memory 2 is completed.

Then, in a process carried out at the next step S110, the contents of the BMAP stored in the internal RAM are updated to reflect the results of the data-updating processing described above. To put it concretely, the contents of the logical-physical address conversion table and the physical-block management information are changed to include the results of the alternate-block processing accompanying the data-updating operations carried out this time and other results as explained earlier by referring to FIGS. 9A to 9D. At this stage, the physical address of a block to be used as an alternate block in the next data-updating processing has been set in the process carried out at the step S105 in an area allocated in the BMAP stored in the internal RAM as an area used for storing the reserved-block address, which is the physical address of the alternate block.

Subsequently, in a process carried out at the next step S111, a control process is carried out to transfer the data updated in the process carried out at the step S110 as new data of the BMAP stored in the internal RAM to the flash memory 2. To put it concretely, the process is carried out to write the BMAP data updated in the process carried out at the step S110 into the BMAP stored in the flash memory 2 in accordance with the processing step explained earlier by referring to FIGS. 10A and 10B.

At the stage the process carried out at the step S111 is completed, the BMAP stored in the flash memory 2 is in a state of containing information matching the present recording state of physical data stored in a segment for which the BMAP is provided.

As described above, in the process carried out at the step S104 of the data-writing processing represented by the flow-chart shown in FIG. 11, a new reserved block is selected and, in the process carried out at the next step S105, the physical address of the selected new reserved block is set. In addition, the process carried out at the step S111 to save the BMAP in the flash memory 2 by copying the BMAP from the internal RAM to the flash memory 2 can also be regarded as a process to store (or write) the physical address of the new reserved block in the flash memory 2 as information to be used in a suspension determination process. These processes are referred to as suspension-determination preparatory processing in this specification.

9-2: Suspension Determination Processing

Figure 12:
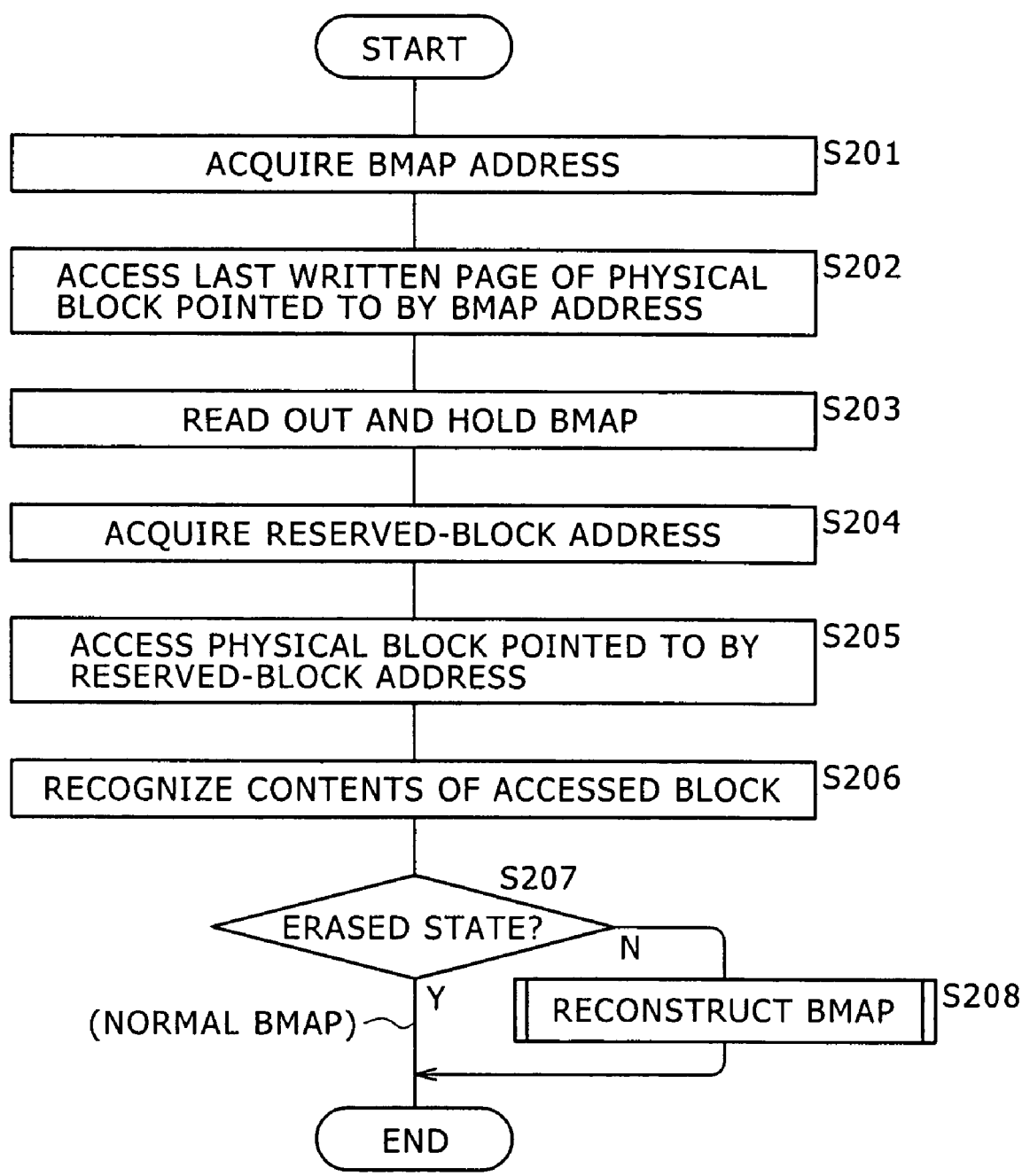
FIG. 12 shows a flowchart representing suspension determination processing according to the embodiment.

Next, suspension determination processing according to the embodiment is explained by referring to a flowchart shown in FIG. 12. As described earlier, the suspension determination processing is processing to produce a result of determination as to whether or not the last data-writing processing to write data into the flash memory 2 has been suspended. The suspension determination processing is carried out when the semiconductor storage apparatus 1 according to the embodiment is activated.

It is to be noted that, the semiconductor storage apparatus 1 according to the embodiment is activated, for example, when the semiconductor storage apparatus 1 is mounted on the host system 10 already in a state of operating with a power supply thereof turned on. In addition, the semiconductor storage apparatus 1 according to the embodiment is also activated, when the power supply of the host system 10 having semiconductor storage apparatus 1 mounted thereon is turned on in a turned-off state.

As shown in the figure, the flowchart representing the suspension determination processing begins with a step S201 at which the data-processing section 3 acquires the physical address of the BMAP. In order to acquire the physical address of the BMAP, the data-processing section 3 makes and access to the system segment on the flash memory 2 to search for the SMAP. Then, the SMAP found in the search is read out from the flash memory 2 and stored in the internal RAM. Subsequently, by referring to a BMAP physical address table included in the SMAP stored in the internal RAM, the data-processing section 3 acquires the physical address of a block containing a BMAP provided for a segment serving as an object of the suspension determination processing.

Then, in a process carried out at the next step S202, the data-processing section 3 makes an access to a BMAP contained in the last written page of a block existing on the flash memory 2 as a block pointed to by the physical address obtained in the process carried out at the step S201. In this way, an access to the most recent effective BMAP can be made. The fact that the last page of a block used for storing BMAPs is used for storing the most recent effective BMAP has been explained earlier by referring to FIGS. 10A and 10B.

Subsequently, in a process carried out at the next step S203, the data-processing section 3 reads out the BMAP accessed in the process carried out at the step S202 from the flash memory 2 and stored for example in the internal RAM.

Then, in a process carried out at the next step S204, the data-processing section 3 acquires the physical address of a reserved block from the structure of the BMAP stored in the internal RAM in the process carried out at the step S203. Subsequently, in a process carried out at the next step S205, the data-processing section 3 makes an access to a physical block existing in the flash memory 2 as a block pointed to by the reserved-block address obtained in the process carried out at the step S204. Then, in a process carried out at the next step S206, the data-processing section 3 reads out data from the reserved block accessed in the process carried out at the step S205 in order to recognize the present contents of the block.

Subsequently, in a process carried out at the next step S207, the data-processing section 3 produces a result of determination as to whether or not the written-data status of the reserved block accessed in the process carried out at the step S205 is erased-data status on the basis of a recognition result obtained in the process carried out at the step S206.

Let us consider for example a case in which the last data-writing processing (or the last data-updating processing) carried out in the past prior to the current activation of the host system 10 was not particularly suspended, or a case in which the data-writing processing represented by the flowchart shown in FIG. 11 has been carried out successfully to completion. In this case, the reserved-block address area in the BMAP stored in the flash memory 2 is used for storing a reserved-block address, which is the physical address of a reserved block selected from blocks cataloged as erased-data blocks. The physical address of the reserved block has been stored in the reserved-block address area in the process carried out at the step S111 of the flowchart shown in FIG. 11. Thus, a block pointed to by the reserved-block address stored in the reserved-block address area of the BMAP should be an erased-data block. Since the block pointed to by the reserved-block address stored in the reserved-block address area of the BMAP is an erased-data block, the determination result produced in the process carried out at the step S207 is an affirmation indicating that the data stored in the reserved block accessed in the process carried out at the step S205 has been erased. In this case, the data-processing section 3 determines that the last data-writing processing (or the last data-updating processing) carried out in the past prior to the current activation of the host system 10 was not particularly suspended. That is to say, the BMAP stored in the flash memory 2 is normal and matches the data-recording state of a segment for which the BMAP is provided. In this case, the execution of the suspension determination processing represented by the flowchart shown in FIG. 12 is ended. Then, for example, other necessary activation processing is carried out.

On the other hand, let us consider a case in which the last data-writing processing (or the last data-updating processing) carried out in the past in accordance with the flowchart shown in FIG. 11 prior to the current activation of the host system 10 has been suspended after the process to actually write data into a new block is started in the course of processing following the step S106 of the flowchart.

In this case, in the process carried out at the step S111, the BMAP stored in the flash memory 2 cannot be updated or, if the BMAP is updated, the updating is not perfect. Thus, the BMAP stored in the flash memory 2 had better be considered to contain left information corresponding to data-writing processing immediately preceding the suspended last data-writing processing. Accordingly, a block pointed to by the reserved-block address included in the BMAP is a block serving as write target of the suspended last data-writing processing. This block has been selected as a new block in the suspended last data-writing processing. New data has been written into this block in an imperfect state.

In this case, the determination result produced in the process carried out at the step S207 is a denial indicating that the data stored in the reserved block accessed in the process carried out at the step S205 has not been erased. Thus, the data-processing section 3 determines that the last data-writing processing (or the last data-updating processing) carried out in the past prior to the current activation of the host system 10 has been suspended. If the determination result produced in the process carried out at the step S207 is a denial, the flow of the processing goes on to a step S208 at which a process to reconstruct the BMAP is carried out. Finally, the execution of the suspension determination processing represented by the flowchart shown in FIG. 12 is ended.

It is to be noted that a plurality of segments (or, speaking accurately, data segments) exists in the flash memory 2. Thus, the suspension determination processing must be carried out for each of the segments at the activation of the host system 10. In this case, for example, in the process carried out at the step S201, the physical address of the BMAP provided for each of the segments is acquired. Then, in a process carried out at the next steps S202 to S208, the suspension determination processing is carried out repeatedly for all the segments.

9-3: BMAP Reconstruction Processing

Figure 13:
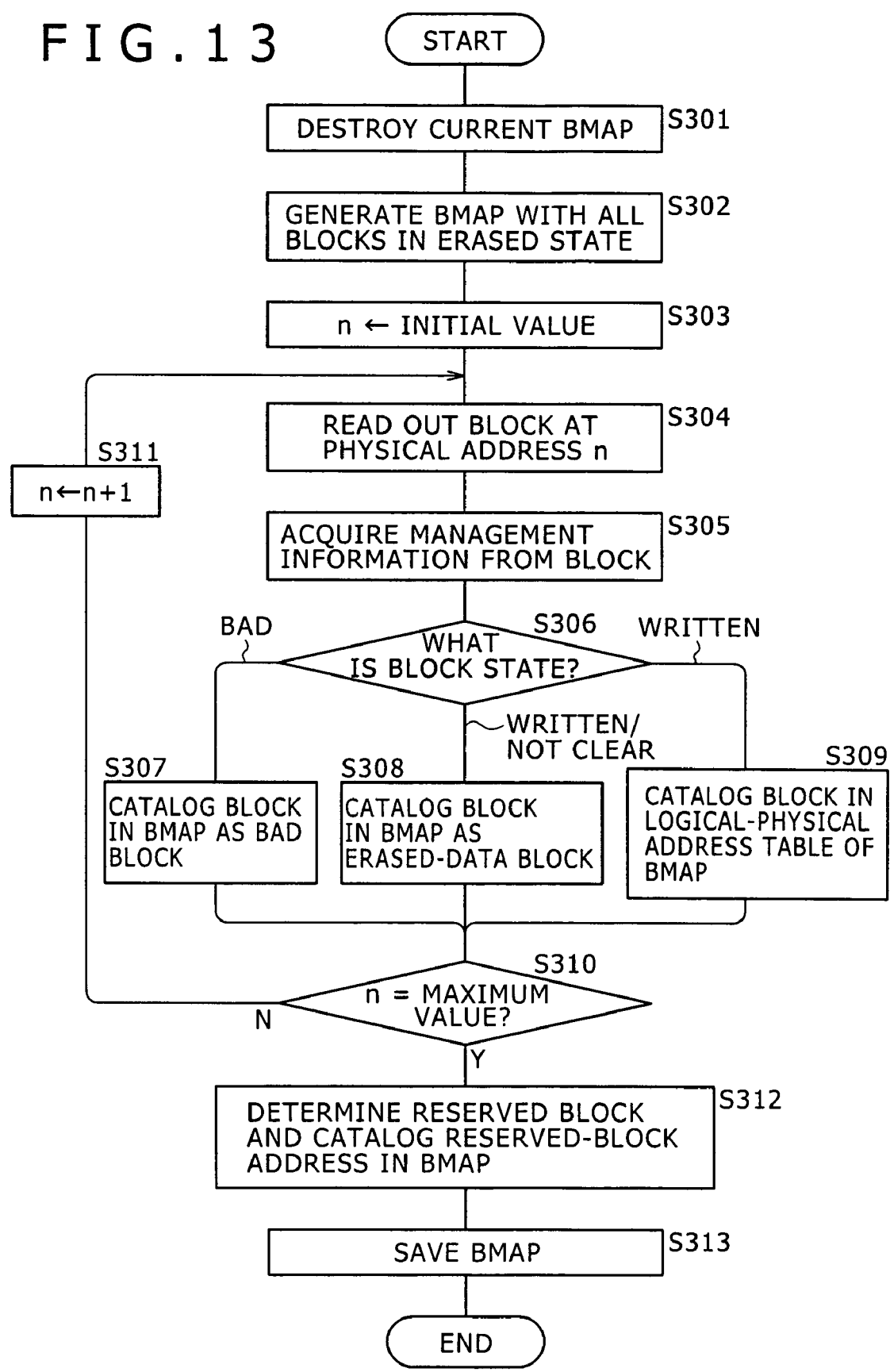
FIG. 13 shows a flowchart representing processing to reconstruct a BMAP after suspension.

A flowchart shown in FIG. 13 represents the processing carried out at the step S208 of the flowchart shown in FIG. 12 to reconstruct a BMAP.

The flowchart representing the processing carried to reconstruct a BMAP begins with a step S301 at which the BMAP currently stored in the internal RAM is destroyed. Then, in a process carried out at the next step S302, a BMAP is generated for a segment being processed currently as a BMAP containing management information indicating that all blocks pertaining to the segment are in an erased-data state. In the following description, the segment being processed currently is referred to as a present segment.

Subsequently, in a process carried out at the next step S303, an initial value is set in a variable n representing the physical address of a block pertaining to the present segment. Thus, the variable n has a value in the range of the physical addresses of blocks pertaining to the present segment. The initial value is the smallest physical address in the range. In the case of the segment structure shown in FIG. 5, for example, the initial value is 0 if the present segment is segment 0. If the present segment is segment 1, on the other hand, the initial value is 512.

Then, in a process carried out at the next step S304, an access is made to a block pointed to by the physical address of n as a block of the flash memory 2 and data is read out from this block.

The redundancy portions of pages included in the block are each used for storing management information (or block internal management information) showing a variety of states for the block in the form of a predetermined structure of the block. Subsequently, in a process carried out at the next step S305, the block internal management information is acquired from the block data read out in the process carried out at the step S304.

Then, in a process carried out at the next step S306, the block internal management information acquired in the process carried out at the next step S305 is examined.

If the result of the examination indicates that the block is a bad block, the flow of the processing goes on to a step S307 at which the block is cataloged as a bad block in the physical-block management information shown in FIG. 6(*d*), 6(*e*) or 7(*d*) as the physical-block management information included in the BMAP.

If the result of the examination indicates that the block is an erased-data block or the block is an unclear block that cannot be recognized, the flow of the processing goes on to a step S308 at which the block is cataloged as an erased-data block in the physical-block management information shown in FIG. 6(*d*), 6(*e*) or 7(*d*) as the physical-block management information included in the BMAP.

If the result of the examination indicates that the block is a written-data block, the flow of the processing goes on to a step S309 at which the physical address of the block is cataloged in the logical-physical address conversion table shown in FIG. 6(*b*) or 7(*b*) as the logical-physical address conversion table included in the BMAP.

The block internal management information includes the logical address assigned to the physical block associated with the information. The logical address included in the block internal management information is used in the process carried out at the step S309 to catalog the physical address of the block in the logical-physical address conversion table. To put it concretely, the physical address of n is cataloged in a 9-bit unit area associated with the logical address included in the block internal management information as a 9-bit entry of the logical-physical address conversion table.

After the process of the step S307, S308 or S309 is completed, the flow of the processing goes on to a step S310 to produce a result of determination as to whether or not the value of the variable n has reached a maximum. In the case of the segment structure shown in FIG. 5, for example, the maximum value is 511 if the present segment is segment 0. If the present segment is segment 1, on the other hand, the maximum value is 1,023.

If the determination result produced at the step S310 indicates that the value of the variable n has not reached the maximum, the flow of the processing goes on to a step S311 at which the variable n is incremented by 1. Then, the flow of the processing goes back to the step S304 to repeat the processes of the step S304 and subsequent steps. This loop of the steps S304 to S310 is executed repeatedly to carry out the processes of the step S304 and subsequent steps on all blocks of the present segment.

In addition, due to a cause such as an error, for example, the flow of the processing may go on from the step S306 to the step S309 in the course of execution of the loop consisting of the processes of the steps S304 to S310 and, in the process carried out at the step S309, the physical address of another block may be found already cataloged in a 9-bit unit area associated with the logical address included in the block internal management information of the current block being processed as a 9-bit entry of the logical-physical address conversion table.

In such a case, a process to merge the other and current blocks is carried out in accordance with a predetermined rule or a process to select either the other block or the current block is performed so as to resolve the overlapping problem. Then, data is erased from a block that should be de-cataloged from the logical-physical address conversion table in accordance with a result of the process to merge the other and current blocks or the process to select either the other block or the current block and the de-cataloged block is re-cataloged in the logical-physical address conversion table as an erased-data block.

As the execution of the processes of the steps S304 to S309 on all blocks of the present segment is completed, the determination result produced in the process carried out at the step S310 is an affirmation. In this case, the flow of the processing goes on to a step S312 at which a reserved block is determined and the physical address of the reserved block is cataloged in the BMAP stored in the internal RAM. At the stage the process of this step is completed, the BMAP stored in the internal RAM matches the data-writing states of the blocks pertaining to the actual segment for which the BMAP is reconstructed and, in addition, the correct physical address of the reserved block has been restored and stored properly in the BMAP. That is to say, also in the sequence of processes to reconstruct the BMAP, the processes of the step S312 and a step S313 to be described below form the so-called suspension-determination preparatory processing.

Then, in a process carried out at the next step S313, the restored BMAP contents stored in the internal RAM are copied to a block pertaining to the segment in the flash memory 2 to save the BMAP in the flash memory 2.

The block internal management information of a block includes information indicating whether or not the BMAP is stored in the block. Thus, at a stage the execution of the processes of the steps S304 to S309 on all blocks of the present segment is completed, it is possible to identify the physical address of a block containing the BMAP. Accordingly, at the step S313, for example, the updating processing explained earlier by referring to FIGS. 10A and 10B is performed with the block of the BMAP used as a target.

10: Other Suspension Determination Configuration

Figure 14:
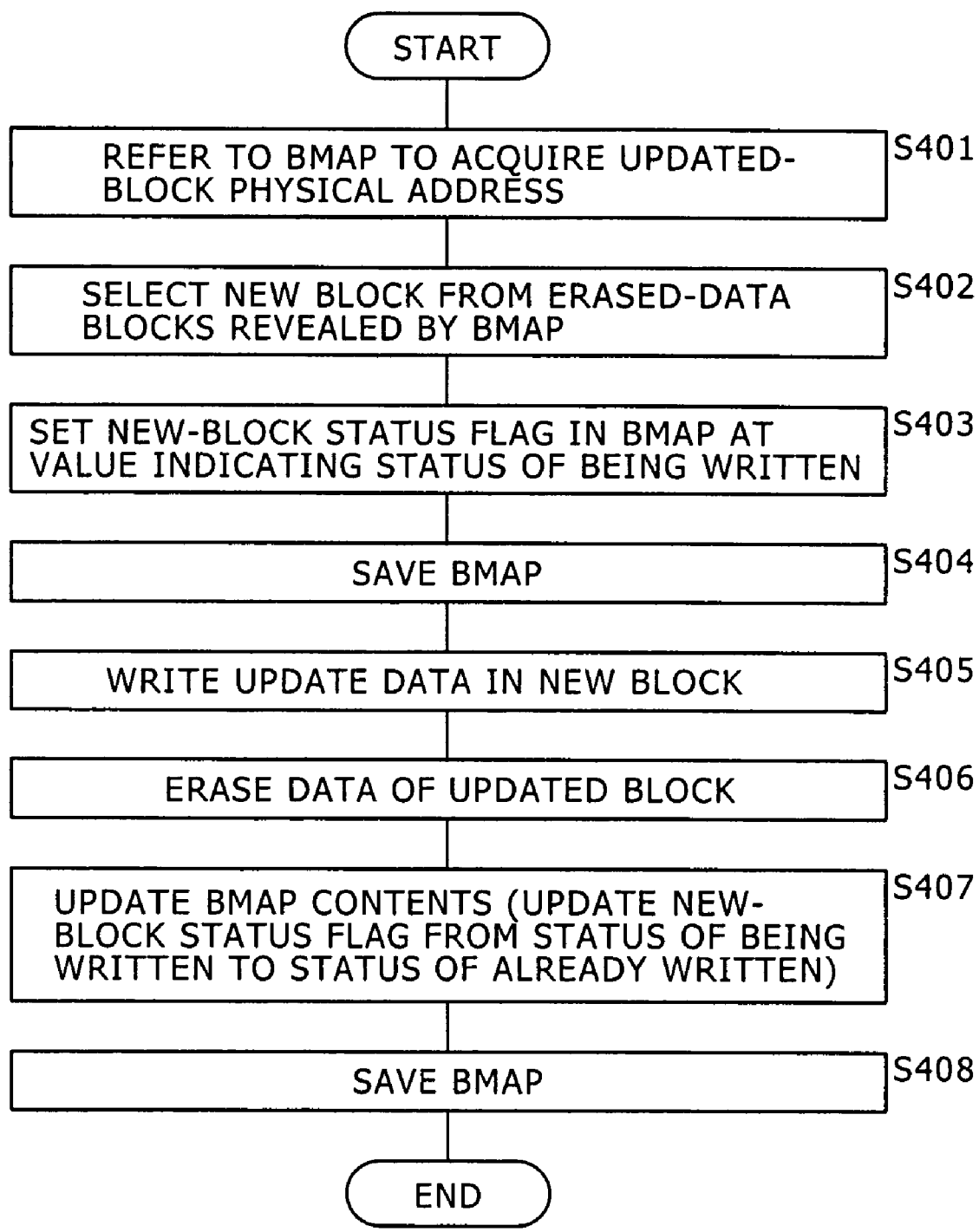
FIG. 14 shows flowchart representing a processing step for writing data into the flash memory (or updating data in the flash memory) in a way different from the embodiment.

As comparison with the embodiment, the following description explains another suspension determination configuration, which was adopted prior to the embodiment, by referring to a flowchart shown in FIG. 14.

The flowchart shown in FIG. 14 represents data-writing processing (or data-updating processing) associated with another suspension determination process not according to the embodiment.

The flowchart begins with a step S401 at which the physical address of a block to be updated is acquired from the BMAP stored in the internal RAM. The process carried out at this step is the same as the process carried out at the step S101 of the flowchart shown in FIG. 11. Then, in a process carried out at the next step S402, the BMAP stored in the internal RAM is referred to in order to select a new block from erased-data blocks managed by using the BMAP.

The BMAP includes at least an area defined at a predetermined position as an area used for storing a status flag of a block as a flag indicating whether or not data has been written or is being written into the block.

Subsequently, in a process carried out at the next step S403, in anticipation of a process to write data into the new block later, the status flag is set in advance at a value indicating that data is being written into the new block. Then, in a process carried out at the next step S404, the BMAP stored in the internal RAM is once copied to the flash memory 2 to update the BMAP stored in the flash memory 2 and save the updated BMAP in the flash memory 2. By saving the BMAP in the flash memory 2, the value set in the process carried out at the step S403 as the value of the status flag is preserved even if the process to write the data into the block is suspended. This is because the flash memory 2 is a non-volatile memory. The value of the status flag is saved in the flash memory 2 in this way for the purpose of obtaining a correct result of the suspension determination processing to be carried out later.

Then, at the next step S405, a process to write data into the new block is carried out typically in accordance with the step for writing data into a new block as explained earlier by referring to FIGS. 9A to 9D. Subsequently, at the next step S406, a process to erase data from the updating-object block is performed in accordance with the step for erasing data from an updating-object block as explained earlier by referring to the same figure. The process to write data into the new block and the process to erase data from the updating-object block are data-writing (data-updating) processing entailing an alternate-block process.

Then, in a process carried out at the next step S407, the BMAP stored in the internal RAM is updated to reflect results of the data-writing (data-updating) processing carried out at the steps S405 and S406. The status flag of the new block is changed from the value indicating that data is being written into the new block to a value indicating that data has been written into the new block.

Subsequently, in a process carried out at the next step S408, control is executed to copy the BMAP stored in the internal RAM to the flash memory 2 in order to save the BMAP in the flash memory 2.

The other suspension determination processing for the data-writing processing represented by the flowchart shown in FIG. 14 is carried out for example at activation of the host system 10 by referring to the status flag included in the BMAP stored in the flash memory 2 as the status flag of the new block.

If the operation to write data of the last page in the processing step represented by the flowchart shown in FIG. 14 has been completed normally, the status flag of the new block is set at a value indicating that data has been written into the new block. Thus, a result of reference to the status flag indicates that data has been written into the new block. In this case, the data-processing section 3 determines that the operation to write data of the last page has been completed normally. If the data-writing processing has been suspended in the course of the processing between the process carried out at the step S405 and the process carried out at the step S408 to preserve the BMAP in the flash memory 2, on the other hand, the process carried out at the step S408 to preserve the BMAP in the flash memory 2 is not completed normally. In this case, the result of reference to the status flag indicates that data is being written into the new block or may indicate unclear status, which is not the status indicating that data has been written into the new block either. Accordingly, the data-processing section 3 determines that the operation to write data of the last page has been suspended.

As described above, even in the case of a configuration implementing the processing step represented by the flowchart shown in FIG. 14, it is possible to produce a result of determination as to whether or not the data-writing (data-updating) processing has been suspended. However, in accordance with the processing step represented by the flowchart shown in FIG. 14, prior to a process to update data, the BMAP is saved once in the flash memory 2 in a process carried out at the step S404 for the purpose of storing the status flag in the BMAP in the flash memory 2 as status, which is used for indicating that data is being written into a new block in case the data-writing (data-updating) processing has been suspended. In consequence, the BMAP needs to be saved in the flash memory 2 twice in the processes carried out at the steps S404 and S408 respectively. In the process carried out at the former step, a tentative BMAP is stored. In the process carried out at the latter step, on the other hand, the final BMAP is saved.

In the case of the embodiment, on the other hand, the physical address of a reserved block is the information used for producing a result of determination as to whether or not the data-writing (data-updating) processing has been suspended. As described above, the information does not reveal the present data-writing status of a new block. Instead, the physical address of the reserved block is the physical address of an erased-data block to be used as a new block in the next data-writing (data-updating) processing. Accordingly, in the whole data-writing (data-updating) processing according to the embodiment, the information used for producing a result of determination as to whether or not the data-writing (data-updating) processing has been suspended is saved in the flash memory 2 only once in the process carried out at the step S1 of the flowchart shown in FIG. 11 by storing the BMAP including the physical address of the reserved block in the flash memory 2.

In this way, it is possible to reduce the number of times the BMAP serving as management information is saved in the flash memory 2 during the data-writing (data-updating) processing. Thus, in the first place, the number of accesses to the flash memory 2 in the data-writing (data-updating) processing of a block can also be decreased. As a result, the length of the period between the start and end of the data-writing (data-updating) processing can be reduced by an amount corresponding to the decrease in such access count. That is to say, the data-writing (data-updating) processing can apparently be carried out at a higher speed.

In the second place, as is obvious from the descriptions given so far, since the number of operations to write data into the flash memory 2 is decreased as explained above, the life of the flash memory 2 can be lengthened by a period corresponding to the decrease in write-operation count. In particular, in the case of a data category having a high updating frequency, the effect for the lengthening of the life of the flash memory 2 is great. An example of data pertaining to such a category is a BMAP.

As described above, the suspension determination configuration according to the embodiment is more excellent than the conventional one as long as factors such as the speed of the data-writing (data-updating) processing and the life of the semiconductor memory are concerned.

It is to be noted, however, that the scope of the present invention is not limited to the configurations described above.

For example, the area identification information provided by the embodiment directly specifies the physical address of a block in the area. However, in dependence on other conditions such as the structure of the BMAP, the area identification information may not directly indicate the physical address of a reserved block in the area. Instead, for example, it is possible to provide a mechanism in which the area identification information includes another indirect predetermined information item and/or another indirect address as pieces of information useable to find the desired reserved block.

In addition, as described so far, configurations shown in figures as the physical format of the flash memory 2, the data structures of the SMAP and BMAPs and others can be properly changed.

On top of that, while the semiconductor storage apparatus 1 according to the embodiment employs the flash memory 2 as an internal embedded semiconductor memory device, any semiconductor memory device other than the flash memory 2 can also be used as long as the semiconductor memory device is a memory device allowing a data-writing operation to be carried out on a physical alternate memory area having a size equivalent to a data erase unit such as the block in the flash memory 2.

In addition, it should be understood by those skilled in the art that a variety of modifications, combinations, sub-combinations and alterations may occur in dependence on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A memory control apparatus comprising:
a processor;
a first memory device having physical data and a storage area divided into erasure unit areas used as a smallest unit of data erasure; and
a second memory device storing instructions, which when executed by the processor, cause the processor to operate with the first memory device to:
(a) carry out an alternate unit-area process as a process to update the physical data in the first memory by performing at least:
(i) a process of writing an update into a write-object erasure unit area selected among said erasure unit areas in an already erased-data state; and
(ii) a process to erase updated data from an update/erase-object unit area including said data to be updated;
(b) generate area identification information used for identifying an erasure unit area in an already erased-data state as a unit area to be determined as a write-object erasure unit area in a next alternate unit-area process in execution of said alternate unit-area process;
(c) physically write said generated area identification information into said first memory upon completion of an alternate unit-area process;
(d) determine an erasure unit area identified by area identification information written in said first memory as a write-object erasure unit area to be used in a current alternate unit-area process;
(e) in response to the first memory being activated, determine whether the last alternate unit-area process to write data into the memory had been suspended due to a prior deactivation of the memory, said prior deactivation of the memory having occurred during a period between the start of a last alternate unit-area process and the end of a process carried out by an information-writing means by:
(i) acquiring a first physical address;
(ii) using said acquired first physical address, to read out a first data from the first physical address, the first data including a physical address of a reserved block, and the first data being read out independent from reading out any data from any other physical addresses;
(iii) prior to reading out any data from the physical address of the reserved block, acquiring the physical address of the reserved block from a structure of said read out first data; and
(iv) after acquiring the physical address of the reserved block, using said acquired physical address of the reserved block to read out reserved block data from said reserved block, said reserved block data indicating at least one of a first status and a second status; and
(f) in response to said reserved block data indicating said first status, reconstruct said first data by:
(i) acquiring block internal management information from a block;
(ii) examining the acquired block internal management information to determine a result; and
(iii) based on the determined result, catalog said block as at least one of:
(A) a bad block;
(B) erased-data block; and
(C) a logical-physical address conversion table, wherein a process of storing write-object erasure unit area information in the first memory is carried out only once for every alternate unit-area process.

2. The memory control apparatus of claim 1, wherein when executed by the processor, the instructions cause the processor to:
(a) use said storage area for storing at least management information for managing written-data status of each erasure unit area of said first storage area; and
(b) write said area identification information at a predetermined position inside said management information.

3. The memory control apparatus of claim 1, when executed by the processor, the instructions cause the processor to generate area identification information used for identifying the bad block.

4. A memory control method comprising:
carrying out an alternate unit-area process as a process to update physical data in a memory, said memory having a storage area divided into erasure unit areas each used as a smallest unit of data erasure, by performing at least:
(a) a process of writing an update into a write-object erasure unit area selected among said erasure unit areas in an already erased-data state; and
(b) a process to erase updated data from an update/erase-object unit area including said data to be updated;
generating area identification information used for identifying an erasure unit area in an already erased-data state as a unit area to be determined as a write-object erasure unit area in a next alternate unit-area process in execution of said alternate unit-area process;
physically writing said generated area identification information into said memory upon completion of an alternate unit-area process;

determining an erasure unit area identified by area identification information written in said memory as a write-object erasure unit area to be used in a current alternate unit-area process;

in response to the memory being activated, determining whether the last alternate unit-area process to write data into the memory had been suspended due to a prior deactivation of the memory, said prior deactivation of the memory having occurred during a period between the start of a last alternate unit-area process and the end of a process carried out in an information-writing step by:
(a) acquiring a first physical address;
(b) using said acquired first physical address to read out a first data from the first physical address, the first data including a physical address of a reserved block, and the first data being read out independent from reading out any data from any other physical addresses;
(c) prior to reading out any data from the physical address of the reserved block, acquiring the physical address of the reserved block from a structure of said read out first data; and
(d) after acquiring the physical address of the reserved block, using said acquired physical address of the reserved block to read out reserved block data from said reserved block, said reserved block data indicating at least one of a first status and a second status; and in response to said reserved block data indicating said first status, reconstructing said first data by:
(a) acquiring block internal management information from a block;
(b) examining the acquired block internal management information to determine a result; and
(c) based on the determined result, catalog said block as at least one of:
(i) a bad block;
(ii) erased-data block; and
(iii) a logical-physical address conversion table, wherein a process of storing write-object erasure unit area information in the memory is carried out only once for every alternate unit-area process.

5. The memory control method of claim 4, including generating area identification information used for identifying the bad block.

6. A program on a computer readable medium executable in a memory control apparatus comprising the steps of:

carrying out an alternate unit-area process as a process to update physical data in a memory, said memory having a storage area divided into erasure unit areas each used as a smallest unit of data erasure, by performing at least:
(a) a process of writing an update into a write-object erasure unit area selected among said erasure unit areas in an already erased-data state; and
(b) a process to erase updated data from an update/erase-object unit area including said data to be updated;

generating area identification information used for identifying an erasure unit area in an already erased-data state as a unit area to be determined as a write-object erasure unit area in a next alternate unit-area process in execution of said alternate unit-area process;

physically writing said generated area identification information into said memory upon completion of an alternate unit-area process;

determining an erasure unit area identified by area identification information written in said memory as a write-object erasure unit area to be used in a current alternate unit-area process;

in response to the memory being activated, determining whether the last alternate unit-area process to write data into the memory had been suspended due to a prior deactivation of the memory, said prior deactivation of the memory having occurred during a period between the start of a last alternate unit-area process and the end of a process carried out in an information-writing step by:
(a) acquiring a first physical address;
(b) using said acquired first physical address to read out a first data from the first physical address, the first data including a physical address of a reserved block, and the first data being read out independent from reading out any data from any other physical addresses;
(c) prior to reading out any data from the physical address of the reserved block, acquiring the physical address of the reserved block from a structure of said read out first data; and
(d) after acquiring the physical address of the reserved block, using said acquired physical address of the reserved block to read out reserved block data from said reserved block, said reserved block data indicating at least one of a first status and a second status; and in response to said reserved block data indicating said first status, reconstructing said first data by:
(a) acquiring block internal management information from a block;
(b) examining the acquired block internal management information to determine a result; and
(c) based on the determined result, catalog said block as at least one of:
(i) a bad block;
(ii) erased-data block; and
(iii) a logical-physical address conversion table, wherein a process of storing write-object erasure unit area information in the memory is carried out only once for every alternate unit-area process.

7. The program executable in a memory control apparatus of claim 6, including generating area identification information used for identifying the bad block.

8. A memory control apparatus comprising:
a data-updating section for carrying out an alternate unit-area process as a process to update physical data in a memory, said memory having a storage area divided into erasure unit areas each used as a smallest unit of data erasure, by performing at least:
(a) a process of writing an update into a write-object erasure unit area selected among said erasure unit areas in an already erased-data state; and
(b) a process to erase updated data from an update/erase-object unit area including said data to be updated;
an information generation section for generating area identification information used for identifying an erasure unit area in an already erased-data state as a unit area to be determined as a write-object erasure unit area in a next alternate unit-area process in execution of said alternate unit-area process;
an information-writing section for physically writing area identification information generated by said information generation section into said memory upon completion of an alternate unit-area process;
an area determination section for determining an erasure unit area identified by area identification information written in said memory as a write-object erasure unit area to be used in a current alternate unit-area process executed by said data-updating section; and a suspension determination section for, in response to the memory being activated, determining whether the last alternate unit-area process to write data into the memory had been suspended due to a prior deactivation of the memory, said prior deactivation of the memory having occurred during a period between the start of a last alternate unit-area process and the end of a process carried out by said information-writing section by:
(a) acquiring a first physical address;
(b) using said acquired first physical address to read out a first data from the first physical address, the first data including a physical address of a reserved block, and the first data being read out independent from reading out any data from any other physical addresses;
(c) prior to reading out any data from the physical address of the reserved block, acquiring the physical address of the reserved block from a structure of said read out first data;
(d) after acquiring the physical address of the reserved block, using said acquired physical address of the reserved block to read out reserved block data from said reserved block, said reserved block data indicating at least one of a first status and a second status; and
in response to said reserved block data indicating said first status, reconstructing said first data by:
(a) acquiring block internal management information from a block;
(b) examining the acquired block internal management information to determine a result; and
(c) based on the determined result, catalog said block as at least one of:
(i) a bad block;
(ii) erased-data block; and
(iii) a logical-physical address conversion table, wherein a process of storing write-object erasure unit area information in the memory is carried out only once for every alternate unit-area process.

9. The memory control apparatus of claim 8, including information generation means for generating area identification information used for identifying the bad block.

\* \* \* \* \*